United States Patent
Chen et al.

(10) Patent No.: US 10,348,373 B2
(45) Date of Patent: Jul. 9, 2019

(54) METHOD AND DEVICE FOR QUANTIZING AND FEEDING BACK CHANNEL INFORMATION AND PRECODING DATA

(71) Applicant: ZTE CORPORATION, Shenzhen (CN)

(72) Inventors: Yijian Chen, Shenzhen (CN); Zhaohua Lu, Shenzhen (CN); Guanghui Yu, Shenzhen (CN); Jing Zhao, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/326,218

(22) PCT Filed: May 12, 2015

(86) PCT No.: PCT/CN2015/078811
§ 371 (c)(1),
(2) Date: Jun. 5, 2017

(87) PCT Pub. No.: WO2016/008330
PCT Pub. Date: Jan. 21, 2016

(65) Prior Publication Data
US 2017/0272133 A1 Sep. 21, 2017

(30) Foreign Application Priority Data

Jul. 16, 2014 (CN) .......................... 2014 1 0340162

(51) Int. Cl.
*H04B 7/06* (2006.01)
*H04B 7/0417* (2017.01)
(Continued)

(52) U.S. Cl.
CPC ......... *H04B 7/0421* (2013.01); *H04B 7/0456* (2013.01); *H04B 7/0634* (2013.01);
(Continued)

(58) Field of Classification Search
CPC .. H04B 7/0421; H04B 7/0456; H04B 7/0452; H04B 7/0634; H04B 7/04; H04L 25/03
See application file for complete search history.

(56) References Cited

U.S. PATENT DOCUMENTS 9,014,288 B2    4/2015  Chen et al.
2008/0260054 A1 10/2008 Myung et al.
(Continued)

FOREIGN PATENT DOCUMENTS

| CN | 101834706 A | 9/2010 |
| CN | 101902312 A | 12/2010 |
| CN | 104202276 A | 12/2014 |

OTHER PUBLICATIONS

PCT International Search Report dated Aug. 10, 2015, Application No. PCT/CN2015/018811, 3 Pages.
(Continued)

*Primary Examiner* — Syed Haider
(74) *Attorney, Agent, or Firm* — Plumsea Law Group, LLC

(57) ABSTRACT

The present invention discloses methods and apparatuses for quantizing, and feeding back channel information and precoding data. In the above methods, a channel measurement pilot signal is received from a base station. The channel information is acquired by performing channel measurement according to the channel measurement pilot signal. CMatrix1 and CMatrix2 are calculated using the channel information, herein CMatrix1 and CMatrix2 are used to quantize the channel information or indicate the base station to perform precoding. And first indication information of CMatrix1 and/or second indication information of CMatrix2 are fed back to the base station. According to the technical solutions of the present invention, as the influence of the polarization leakage is considered in the feedback design, a significant performance gain exists in a case that the polarization leakage actually occurs.

14 Claims, 7 Drawing Sheets

(51) Int. Cl.
   *H04L 25/03*   (2006.01)
   *H04B 7/0456*  (2017.01)
   *H04B 7/04*    (2017.01)
   *H04B 7/0452*  (2017.01)

(52) U.S. Cl.
   CPC ............... *H04L 25/03* (2013.01); *H04B 7/04* (2013.01); *H04B 7/0452* (2013.01)

(56) References Cited

U.S. PATENT DOCUMENTS

| | | | |
|---|---|---|---|
| 2012/0082149 A1* | 4/2012 | Kim | H04B 7/022 370/338 |
| 2013/0136065 A1* | 5/2013 | Chen | H04B 7/0645 370/329 |
| 2013/0202057 A1 | 8/2013 | Chen et al. | |
| 2014/0133601 A1* | 5/2014 | Zhou | H04L 1/06 375/295 |
| 2014/0241449 A1* | 8/2014 | Prasad | H04B 7/0456 375/267 |
| 2016/0087701 A1* | 3/2016 | Wu | H04B 7/0417 375/267 |

OTHER PUBLICATIONS

Samsung "Views on the feedback framework for Rel. 10", R1-103377, 3GPP TSG RAN WG1 Meeting #61, Montreal, Canada, May 10-May 14, 2010 XP050598411, pp. 1-17.

Extended European Search Report dated Jul. 24, 2017, Application No. 15822602.7-1874, Applicant ZTE Corporation, 8 Pages.

\* cited by examiner

An indication information set is received from a terminal, herein the indication information set comprises one of: first indication information of CMatrix1 and second indication information of a second matrix CMatrix2, the first indication information, the second indication information and third indication information of a phase θ, and the first indication information, the second indication information, the third indication information and fourth indication information of a proportion κ  — S502

When the indication information set comprises the first indication information and the second indication information, CMatrix1 is acquired through the first indication information and CMatrix2 is acquired through the second indication information; or when the indication information set comprises the first indication information, the second indication information and the third indication information of the phase θ, CMatrix1 is acquired through the first indication information, CMatrix2 is acquired through the second indication information, and θ is acquired through the third indication information; or when the indication information set comprises the first indication information, the second indication information, the third indication information and the fourth indication information, CMatrix1 is acquired through the first indication information, CMatrix2 is acquired through the second indication information, θ is acquired through the third indication information, and κ is acquired through the fourth indication information  — S504

When the indication information set comprises the first indication information and the second indication information, a third matrix CMatrix is calculated according to a function F(CMatrix1,CMatrix2,θ,κ) which is previously agreed with the terminal using the acquired CMatrix1 and CMatrix2 and θ and κ which are predetermined and issued to the terminal; or when the indication information set comprises the first indication information, the second indication information and the third indication information of the phase θ, CMatrix is calculated according to the function F(CMatrix1,CMatrix2,θ,κ) using the acquired CMatrix1 and CMatrix2, θ and κ which is predetermined and issued to the terminal; or when the indication information set comprises the first indication information, the second indication information, the third indication information and the fourth indication information, CMatrix is calculated according to the function F(CMatrix1,CMatrix2,θ,κ) using the acquired CMatrix1 and CMatrix2, θ and κ  — S506

The data is precoded using CMatrix  — S508

FIG. 5

METHOD AND DEVICE FOR QUANTIZING AND FEEDING BACK CHANNEL INFORMATION AND PRECODING DATA

CROSS-REFERENCE TO RELATED APPLICATIONS

This application is a U.S. national phase of PCT Application No. PCT/CN2015/078811 filed on May 12, 2015, which claims priority to Chinese Patent Application No. 201410340162.X filed on Jul. 16, 2014, the disclosures of which are incorporated in their entirety by reference herein.

TECHNICAL FIELD

The present disclosure relates to the field of communications, and in particular, to methods and apparatuses for quantizing, and feeding back channel information and precoding data.

BACKGROUND

In a wireless communication system, a plurality of antennas is usually used to acquire a higher transmission rate by adopting a spatial multiplexing manner between a transmitting end and a receiving end. In contrast to a general spatial multiplexing method, an enhanced technical solution is mentioned in the related technology. In this solution, a receiving end feeds back channel information to a transmitting end, and the transmitting end greatly improves the transmission performance using some transmission precoding technologies according to the acquired channel information. For Single-User Multi-Input Multi-Output (MIMO for short), channel eigenvector information is directly used for precoding. While for Multi-User MIMO (MU-MIMO), more accurate channel information is needed.

In some technologies of the fourth generation (4G) mobile communication technology such as the Third Generation Partnership Project (3GPP) Long Term Evolution (LTE) technology and International Telecommunication Union (ITU) 802.16m standard specifications, channel information is mainly fed back using a relatively simple single codebook feedback method, while the performance of the MIMO transmission precoding technique is more dependent on the accuracy of the codebook feedback. The basic principle of quantization and feedback of channel information based on the codebook is briefly described as follows: assuming that a limited feedback channel capacity is Bbps/Hz, then a number of available codewords is $N=2^B$. It is assumed that an eigenvector space of a channel matrix H is quantized to form a codebook space $\Re = \{F_1, F_2 \ldots F_N\}$, the transmitting end and the receiving end collectively store or generate the codebook in real time (the same for the receiving end/transmitting end). The receiving end selects a code word $\hat{F}$ which best matches the channel from the codebook space $\Re$ according to the acquired channel matrix H in accordance with a certain criterion, and feeds back a codeword serial number i of the codeword $\hat{F}$ to the transmitting end. Here, the codeword serial number is also referred to as a Precoding Matrix Indicator (PMI for short). And the transmitting end finds a corresponding precoded codeword according to the codeword serial number i which is fed back, so as to acquire the channel information, herein $\hat{F}$ represents eigenvector information of the channel. Generally, $\Re$ may be divided into codebooks corresponding to multiple ranks, and there are multiple corresponding codewords for each rank to quantize a precoding matrix formed by channel eigenvectors for the rank. In general, there may be N columns of codewords when a rank is N. Therefore, the codebook $\Re$ may be divided into multiple sub-codebooks according to different ranks, as shown in table 1.

TABLE 1

| $\Re$ | | | |
|---|---|---|---|
| A number of layers v (rank) | | | |
| 1 | 2 | ... | N |
| $\Re_1$ | $\Re_2$ | ... | $\Re_N$ |
| A set of codeword vectors when a column number is 1 | A set of codeword vectors when a column number is 2 | ... | A set of codeword vectors when a column number is N | herein, when Rank=1, the codewords are all in a vector form, and when Rank>1, the codewords are all in a matrix form. The codebook in the LTE protocol uses the feedback method of this codebook quantization. The codebook of the LTE downlink 4-transmission antenna is shown in Table 2. In fact, the precoding codebook and the channel information quantization codebook have the same meaning in LTE. In the following, for the sake of consistency, the vector may also be seen as a matrix with a dimension of 1.

TABLE 2

| Code word index $u_n$ | A total Number of layers $\upsilon$ (RI) | | | |
|---|---|---|---|---|
| | 1 | 2 | 3 | 4 |
| 0  $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1  $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2  $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3  $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4  $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5  $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6  $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7  $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8  $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9  $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10  $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11  $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12  $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13  $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14  $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15  $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | herein, $W_n=I-2u_n u_n^H/u_n^H u_n$, I is an identity matrix, $W_k^{(j)}$ represents a vector in a $j^{th}$ column of a matrix $W_k$. $W_k^{(j_1, j_2, \cdots, j_n)}$ represents a matrix composed of $j_1^{th}$, $j_2^{th}, \ldots, j_n^{th}$ columns of the matrix $W_k$.

In the LTE-Advance technology, the codebook feedback is enhanced to a certain extent. For Rank=r, herein r is an integer, it differs from the previous 4Tx codebook in that when the codebook feedback is used, feedback of codewords in the corresponding codebook require feedback of 2 PMIs to represent their information, which can generally be expressed as shown in Table 3 below.

TABLE 3

| | | $i_2$ | | | |
|---|---|---|---|---|---|
| | | 0 | 1 | ... | $N_2$ |
| $i_1$ | 0 | $W_{i_1,i_2}$ | $W_{i_1,i_2}$ | $W_{i_1,i_2}$ | $W_{i_1,i_2}$ |
| | 1 | $W_{i_1,i_2}$ | $W_{i_1,i_2}$ | $W_{i_1,i_2}$ | $W_{i_1,i_2}$ |
| | ... | $W_{i_1,i_2}$ | $W_{i_1,i_2}$ | $W_{i_1,i_2}$ | $W_{i_1,i_2}$ |
| | N1 | $W_{i_1,i_2}$ | $W_{i_1,i_2}$ | $W_{i_1,i_2}$ | $W_{i_1,i_2}$ |

Here, $W_{i_1,i_2}$ is a codeword commonly indicated by $i_1$ and $i_2$, and can usually be written as a function form $W(i_1,i_2)$, and it only needs to determine $i_1$ and $i_2$. For example, when r=2, $i_1$ and $i_2$ are as shown in Table 4.

TABLE 4

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \phi_n v_m & -\phi_n v_{m'} \end{bmatrix}$, $\phi_n = e^{j\pi n/2}$, $v_m = [1 \ e^{j2\pi m/32}]^T$ $\varphi_n = e^{j\pi n/2}$
$v_m = [1 \ e^{j2\pi m/32} \ e^{j4\pi m/32} \ e^{j6\pi m/32}]^T$ The primary difference is in that: a codeword model is defined for each supported condition of a number of layers, feedback is performed based on the codeword model, and the meaning of parameters in the model is determined through one or two PMIs which are fed back, so as to finally acquire accurate channel eigenvector information for precoding.

With the rapid development of wireless communication technology, wireless applications of users are increasingly abundant, which also bring wireless data services to grow rapidly. It is predicted that in the next 10 years, the data services will grow at 1.6-2 times the rate per year. This will undoubtedly bring unlimited opportunities and enormous challenges to wireless access networks, and the multi-antenna technology is a key technology to deal with the challenges of the explosive growth of wireless data services. Currently, the multi-antenna technology supported in 4G supports only at most 8-port horizontal dimension beamforming technology, and has a large potential to further significantly increase the system capacity.

At present, the multi-antenna technology mainly evolved in terms of purposes such as a greater beamforming/precoding gain, a larger spatial multiplexing layer number (MU/SU) and a smaller inter-layer interference, a more comprehensive coverage, a smaller inter-site interference, etc. Massive MIMO and three-dimensional MIMO (3D MIMO) are the two most important technologies for MIMO evolution in the next-generation wireless communications.

In a Massive MIMO technology-based system, a large-scale antenna array is configured at a base station side, for example, 16, 32, 64, 128, 256 antennas, or even a large number of antennas. The antennas referred to in this application document are generally understood to be defined antenna ports. In this way, multiple users are co-multiplexed at the same time using the MU-MIMO technology during data transmission. Generally speaking, a ratio between the number of antennas and the number of multiplexed users is maintained to be about 5-10 times. On the one hand, a correlation coefficient between channels of any two users exponentially decays with the increase of the number of antennas, no matter whether in a strong correlated channel in the line-of-sight environment or an unrelated channel under rich scattering. For example, when 100 or more antennas are configured at the base station side, the correlation coefficient between the channels of any two users approaches 0, that is, channels corresponding to multiple users are close to be orthogonal. On the other hand, a large array can result in very impressive array gain and diversity gain. In addition, in order to save the size of the antenna and provide better diversity performance or multiplexing capability, dual-polarized antennas are also widely used in the massive MIMO. The use of the dual-polarized antennas can reduce the size of the antennas to a half of the original size.

For the Massive MIMO, due to the requirements for the quantization accuracy in a case of the introduction of a large number of antennas and the increase of the antenna dimension, in an existing codebook feedback model, there are some defects in feedback of channel characteristic information or precoding information using a quantization model such as $$W_{m,m',n}^{(2)} = \frac{1}{4}\begin{bmatrix} v_m & v_{m'} \\ \phi_n v_m & -\phi_n v_{m'} \end{bmatrix}$$

etc. as shown in Table 4, and the primary reasons for such defects are that the problem of polarization leakage which actually exists in the channel is not taken into account when the feedback model is designed. The complete isolation of ideal polarization does not exist, and a signal fed into a polarized antenna will always be fed into another polarized antenna more or less. In the electromagnetic wave propagation process, metal outside a building may often lead to polarization rotation, which will cause polarization leakage. Complex coupling characteristics exist in a non-ideal dual-polarized system, and therefore, the channel response characteristics of the dual-polarized system are also very complex. On the basis that the idealized dual-polarization channel without consideration of polarization leakage is not suitable for the Massive MIMO, the feedback method which is designed for the idealized dual-polarization channel is not very robust in the Massive MIMO. Therefore, some existing design considerations may need to be improved and enhanced in order to be suitable for the Massive MIMO with higher accuracy requirements.

It is assumed that the dual-polarized antenna system has Mt transmission antennas and Mr reception antennas, herein Mt/2 transmission antennas are polarized in a direction and other Mt/2 transmission antennas are polarized in a direction. Similarly, at the receiving end, the Mr/2 transmission antennas are polarized in a direction and other Mr/2 transmission antennas are polarized in a direction. FIG. 1 is a diagram of Mt transmission antennas and Mr reception antennas existing in a dual polarized antenna system according to the related art. As shown in FIG. 1, a received signal y may be modeled as (1):

$$y=\sqrt{\rho}z^*Hfs+z^*n \quad (1)$$

herein z is a received weight vector in an Mr dimension of the receiving end, f is a unit-norm precoding vector of the transmitting end, n is a Gaussian white noise in an Mr dimension, which follows a distribution of CN(0,1), s is a transmitted signal, $E_s(ss^H) \leq 1$, and $\rho$ represents an SNR.

A dual-polarization channel H may be modeled as (2):

$$H=H_w \cdot X \quad (2)$$

herein, · represents Hadamard Product of the matrixes, which is a non-correlated channel scenario, and $H_w$ is approximately an Nr×Nt-dimensional Gaussian channel. A channel response between each pair of antennas is subject to a distribution of CN(0,1). X is a matrix related to cross-polar discrimination (XPD), and has an expression of (3), and $\kappa$ represents a cross-polar ratio (XPR), which is an inverse of XPD.

$$X = \begin{bmatrix} 1 & \sqrt{\kappa} \\ \sqrt{\kappa} & 1 \end{bmatrix} \otimes \begin{bmatrix} 1 & \cdots & 1 \\ \cdots & \cdots & \cdots \\ 1 & \cdots & 1 \end{bmatrix}_{Mr \times Mt} \quad (3)$$

herein Mr and Mt represent reception and transmission antennas, and in the existing technology, it is assumed that $\sqrt{\kappa}$ is a model of a 0 analysis channel eigenvector. Most of the research hypotheses in the paper are that cases of making a research on a relatively ideal X. When a case without polarization leakage is considered, the eigenvectors of the channel have block diagonal characteristics, for example, $$\begin{bmatrix} v_1 & v_2 \\ av_1 & -av_2 \end{bmatrix},$$

herein $v_1$ and $v_2$ are vectors in an Mt/2 dimension, and a is a phase parameter with a modulo value of 1. This conclusion is widely used in a feedback design. A model in table 4, i.e., $$W^{(2)}_{m,m',n} = \frac{1}{4} \begin{bmatrix} v_m & v_{m'} \\ \phi_n v_m & -\phi_n v_{m'} \end{bmatrix}$$

is acquired based on the model.

However, in practice, a case that there is completely no polarization leakage is almost not existent in the actual system, and a typical polarization leakage ratio (XPR) in the various scenarios of the 3GPP LTE is usually regulated to be concentrated in a range of −4 dB~−12 dB, while for a typical scenario, it is generally around −8 dB, and regulations in some of the other literatures are similar, for example: [x] indicates that $\kappa$ is typically −7.2 dB to −8 dB.

In a case where the number of transmission antennas is small, $\sqrt{\kappa}$ is considered approximately to be 0, which does not have significant influence on a codeword chordal distance, but with the increase of the number of transmission antennas, the influence of $\sqrt{\kappa}$ on the chordal distance will increase. By taking 32 and 64 antennas as an example, a feedback designed without considering the polarization leakage, for example, meets a codeword with a model of $$W^{(2)}_{m,m',n} = \frac{1}{4} \begin{bmatrix} v_m & v_{m'} \\ \phi_n v_m & -\phi_n v_{m'} \end{bmatrix},$$

which has an upper bound of quantized feedback performance, and if it is characterized by the chordal distance, a bound of a minimum chordal distance between the codeword and the actual channel eigenvector can be solved by assuming that parameters such as $v_i$, $v_j \alpha$ etc. have unlimited overhead. FIG. 2 is a diagram of a CDF corresponding to 32Tx without considering the minimum quantization error (chordal distance) of the polarization leakage in the related technology. FIG. 3 is a diagram of a CDF corresponding to 64Tx without considering the minimum quantization error (chordal distance) of the polarization leakage in the related technology. As shown in FIG. 2 and FIG. 3, the polarization leakage considered in the simulation here is $\kappa$=−8 dB, i.e., $\sqrt{\kappa}$=0.3981. It can be seen that even if polarization leakage of only −8 dB is considered, in about 70% cases, the theoretical minimum chordal distance between the codeword and the channel eigenvector is more than 0.5 for 32Tx, and in about 80% cases, the theoretical minimum chordal distance between the codeword and the channel eigenvector is more than 0.5 for 64Tx, and the chordal distance can reflect a loss of the useful signal power. Therefore, the existing dual-polarization codeword model has a bottleneck, that is, there is still a room for optimization, and in the optimized space, in many cases, a gain for the useful signal is more than 3 dB. In the actual channel environment, since XPR=−8 dB is only a relatively typical value, $\kappa$ of some of the UEs in the actual system may reach −4 dB, which may have greater influences on the performance, and will seriously affect the feedback performance of these UEs, thus affecting the user data service rate. Therefore, the feedback model without considering polarization leakage will be limited by a theoretical upper limit, which will restrict the system performance.

In conclusion, the feedback model is designed without considering polarization leakage in the related technology, and the feedback based on this feedback model is not applicable to Massive MIMO because Massive MIMO is very sensitive to the quantization accuracy of channel information. Therefore, the requirements for the accuracy of the feedback model are also very high.

SUMMARY

The embodiments of the present disclosure provide methods and apparatuses for quantizing, and feeding back channel information and precoding data, which at least solve the problem in the related technology that the designed feedback model is lack of considering a polarization leakage condition.

According to an aspect of the embodiments of the present disclosure, there is provided a method for quantizing and feeding back channel information.

The method for quantizing and feeding back channel information includes the following steps. A channel measurement pilot signal is received from a base station. The channel information is acquired by performing channel measurement according to the channel measurement pilot signal. A first matrix CMatrix1 and a second matrix CMatrix2 are calculated by using the channel information, herein CMatrix1 and CMatrix2 are used to quantize the channel information or indicate the base station to perform precoding, and first indication information of CMatrix1 and/or second indication information of CMatrix2 are fed to the base station.

In an exemplary embodiment, CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as a model, and CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}$$

as a model. And $V_n$, $V_m$, $V_i$ or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, herein Mt is the number of transmission antennas, floor(r/2) represents round down of r/2, r represents information of the number of transmission layers or rank information, and a, $\alpha$ and $\beta$ are complex values.

In an exemplary embodiment, after calculating CMatrix1 and CMatrix2 using the channel information, the method further includes building a third matrix CMatrix through a function F(CMatrix1,CMatrix2,$\theta$,$\kappa$), herein CMatrix is used to represent the quantized channel characteristic information or indicate the base station to perform precoding, $\theta$ is a phase, and $\kappa$ is a real value.

In an exemplary embodiment, $\theta$ is a phase parameter which is determined by the base station and is notified by high layer configuration signaling, or $\theta$ is calculated according to the channel information and third indication information of $\theta$ is fed back to the base station.

In an exemplary embodiment, $\kappa$ is a proportional parameter which is determined by the base station and is notified by high layer configuration signaling, or $\kappa$ is calculated according to the channel information and fourth indication information of $\kappa$ is fed back to the base station.

In an exemplary embodiment, CMatrix1 is fed back using a first codebook CB1, wherein a codeword model included in CB1 is $$\begin{bmatrix} V_n & V_m \\ aV_n & -aV_m \end{bmatrix} \text{ or } \begin{bmatrix} V_n & 0 \\ 0 & V_m \end{bmatrix}.$$

In an exemplary embodiment, a value of a is 1 and/or j.

In an exemplary embodiment, CMatrix1 is jointly indicated and determined by a first set I1 which is composed of a plurality of Precoding Matrix Indexes (PMIs).

In an exemplary embodiment, CMatrix2 is fed back using a second codebook CB2, herein a codeword model included in CB2 is $$\begin{bmatrix} V_i & \alpha V_j \\ V_j & -\beta V_i \end{bmatrix} \text{ or } \begin{bmatrix} 0 & V_j \\ V_i & 0 \end{bmatrix}.$$

In an exemplary embodiment, values of $\alpha$ and $\beta$ are 1.

In an exemplary embodiment, CMatrix2 is jointly indicated and determined by a second set I2 which is composed of a plurality of Precoding Matrix Indexes (PMIs).

In an exemplary embodiment, I1 and I2 at least comprise one identical index.

In an exemplary embodiment, F(CMatrix1, CMatrix2,$\theta$,$\kappa$)=CMatrix1+$e^{j\Theta}$*f($\kappa$)*CMatrix2, herein f($\kappa$) is a function with an argument of $\kappa$.

In an exemplary embodiment, f($\kappa$) is one of $$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, \text{ and } f(\kappa) = \left(\frac{1}{\sqrt{\kappa}+\kappa}\right)^q,$$

herein q is a real value greater than 0.

In an exemplary embodiment, q=0.5, 1 or 2.

According to another aspect of the present disclosure, there is provided a method for precoding data.

The method for precoding data according to the embodiments of the present disclosure includes as follows. an indication information set from a terminal is received, herein the indication information set includes one of the following information: first indication information of a first matrix CMatrix1 and second indication information of a second matrix CMatrix2, the first indication information, the second indication information and third indication information of a phase $\theta$, and the first indication information, the second indication information, the third indication information and fourth indication information of a proportion $\kappa$. When the indication information set includes the first indication information and the second indication information, CMatrix1 is acquired through the first indication information and CMatrix2 is acquired through the second indication information. Or when the indication information set includes the first indication information, the second indication information and the third indication information of the phase $\theta$, CMatrix1 is acquired through the first indication information, CMatrix2 is acquired through the second indication information, and $\theta$ is acquired through the third indication information. Or when the indication information set includes the first indication information, the second indication information, the third indication information and the fourth indication information, CMatrix1 is acquired through the first indication information, CMatrix2 is acquired through the second indication information, $\theta$ is acquired through the third indication information, and $\kappa$ is acquired through the fourth indication information. When the indication information set includes the first indication information and the second indication information, a third matrix CMatrix is calculated according to a function F(CMatrix1,CMatrix2,$\theta$,$\kappa$) which is previously agreed with the terminal using the acquired CMatrix1 and CMatrix2 and $\theta$ and $\kappa$ which are predetermined and issued to the terminal. Or when the indication information set includes the first indication information, the second indication information and the third indication information of the phase $\theta$, CMatrix is calculated according to the function F(CMatrix1,CMatrix2,θ,κ) using the acquired CMatrix1 and CMatrix2, θ and κ which is predetermined and issued to the terminal. Or when the indication information set includes the first indication information, the second indication information, the third indication information and the fourth indication information, CMatrix is calculated according to the function F(CMatrix1, CMatrix2,θ,κ) using the acquired CMatrix1 and CMatrix2, θ and κ. And the data is precoded by using CMatrix.

According to another aspect of the embodiments of the present disclosure, there is provided a method for quantizing and feeding back channel information.

The method for quantizing and feeding back channel information according to the embodiments of the present disclosure includes as follows. A channel measurement pilot signal is received from a base station. The channel information is acquired by performing channel measurement according to the channel measurement pilot signal. A first type of information, a second type of information and a third type of information are calculated by using the channel information, herein the first type of information includes information indicating N vectors u1, u2, . . . , uN, the second type of information includes indication information of P weighting amplitude information $A_1, A_2, \ldots A_P$, and the third type of information includes indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_P^B$; u1, u2, . . . uN, $A_1, A_2, \ldots A_P$ and $\varphi_1^A, \varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, . . . uN, $A_1, A_2, \ldots A_P, \varphi_1^A, \varphi_2^A, \ldots \varphi_P^A$), u1, u2, . . . uN, $A_1, A_2, \ldots A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, . . . uN, $A_1, A_2, \ldots A_P, \varphi_1^B, \varphi_1^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2). the first type of information is acquired according to the first indication information, the second type of information is acquired according to the second indication information, and the third type of information is acquired according to the third indication information, DMatrix1 and DMatrix2 are calculated by using the first type of information, the second type of information and the third type of information, and R or W is calculated through Q(DMatrix1, DMatrix2). The data is precoded according to R or W.

According to another aspect of the embodiments of the present disclosure, there is provided an apparatus for quantizing and feeding back channel information.

The apparatus for quantizing and feeding back channel information according to the embodiments of the present disclosure includes the following modules. A reception module is arranged to receive a channel measurement pilot signal from a base station. An acquisition module is arranged to acquire the channel information by performing channel measurement according to the channel measurement pilot signal. A calculation module is arranged to calculate a first matrix CMatrix1 and a second matrix CMatrix2 using the channel information, herein CMatrix1 and CMatrix2 are used to quantize the channel information or indicate the base station to perform precoding. And a feedback module is arranged to feed back first indication information of CMatrix1 and/or second indication information of CMatrix2 to the base station.

In an exemplary embodiment, CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as a model, and CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}$$

as a model. And $V_n$, $V_m$, $V_i$ or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, herein Mt is the number of transmission antennas, floor(r/2) represents round down of r/2, r represents information of a number of transmission layers or rank information, and a, α and β are complex values.

In an exemplary embodiment, the above apparatus further includes as follows. A building module is arranged to build a third matrix CMatrix through a function F(CMatrix1, CMatrix2,θ,κ), herein CMatrix is used to represent the quantized channel characteristic information or indicate the base station to perform precoding, θ is a phase, and κ is a real value.

In an exemplary embodiment, θ is a phase parameter which is determined by the base station and is notified by high layer configuration signaling, or θ is calculated according to the channel information and third indication information of θ is fed back to the base station.

In an exemplary embodiment, κ is a proportional parameter which is determined by the base station and is notified by high layer configuration signaling, or κ is calculated according to the channel information and fourth indication information of κ is fed back to the base station.

In an exemplary embodiment, CMatrix1 is fed back using a first codebook CB1, herein a codeword model included in CB1 is $$\begin{bmatrix} V_n & V_m \\ aV_n & -aV_m \end{bmatrix} \text{ or } \begin{bmatrix} V_n & 0 \\ 0 & V_m \end{bmatrix}.$$

In an exemplary embodiment, a value of a is 1 and/or j.

In an exemplary embodiment, CMatrix1 is jointly indicated and determined by a first set I1 which is composed of a plurality of Precoding Matrix Indexes (PMIs).

In an exemplary embodiment, CMatrix2 is fed back using a second codebook CB2, herein a codeword model included in CB2 is $$\begin{bmatrix} V_i & \alpha V_j \\ V_j & -\beta V_i \end{bmatrix} \text{ or } \begin{bmatrix} 0 & V_j \\ V_i & 0 \end{bmatrix}.$$

In an exemplary embodiment, values of α and β are 1.

In an exemplary embodiment, CMatrix2 is jointly indicated and determined by a second set I2 which is composed of a plurality of Precoding Matrix Indexes (PMIs).

In an exemplary embodiment, I1 and I2 at least include one identical index.

In an exemplary embodiment, F(CMatrix1, CMatrix2,θ,κ)=CMatrix1+e^{jθ}*f(κ)*CMatrix2, herein f(κ) is a function with an argument of κ.

In an exemplary embodiment, f(κ) is one of $$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, \text{ and } f(\kappa) = \left(\frac{1}{\sqrt{\kappa}+\kappa}\right)^q,$$

herein q is a real value greater than 0.

In an exemplary embodiment, q=0.5, 1 or 2.

According to another aspect of the embodiments of the present disclosure, there is provided an apparatus for precoding data.

The apparatus for precoding data according to the embodiments of the present disclosure includes the following modules. A reception module is arranged to receive an indication information set from a terminal, herein the indication information set includes one of the following information: first indication information of a first matrix CMatrix1 and second indication information of a second matrix CMatrix2, the first indication information, the second indication information and third indication information of a phase θ, and the first indication information, the second indication information, the third indication information and fourth indication information of a proportion κ. An acquisition module is arranged to, when the indication information set includes the first indication information and the second indication information, acquire CMatrix1 through the first indication information and acquire CMatrix2 through the second indication information. Or when the indication information set includes the first indication information, the second indication information and the third indication information of the phase θ, CMatrix1 is acquired through the first indication information, CMatrix2 is acquired through the second indication information, and θ is acquired through the third indication information. Or when the indication information set includes the first indication information, the second indication information, the third indication information and the fourth indication information, CMatrix1 is acquired through the first indication information, CMatrix2 is acquired through the second indication information, θ is acquired through the third indication information, and κ is acquired through the fourth indication information. A calculation module is arranged to, when the indication information set includes the first indication information and the second indication information, calculate a third matrix CMatrix according to a function F(CMatrix1, CMatrix2,θ,κ) which is previously agreed with the terminal using the acquired CMatrix1 and CMatrix2 and θ and κ which are predetermined and issued to the terminal. Or when the indication information set includes the first indication information, the second indication information and the third indication information of the phase θ, CMatrix is calculated according to the function F(CMatrix1,CMatrix2,θ,κ) using the acquired CMatrix1 and CMatrix2, θ and κ which is predetermined and issued to the terminal. Or when the indication information set includes the first indication information, the second indication information, the third indication information and the fourth indication information, CMatrix is calculated according to the function F(CMatrix1, CMatrix2,θ,κ) using the acquired CMatrix1 and CMatrix2, θ and κ. And a precoding module is arranged to precode the data using CMatrix.

According to another aspect of the embodiments of the present disclosure, there is provided another apparatus for quantizing and feeding back channel information.

The apparatus for quantizing and feeding back channel information according to the embodiments of the present disclosure includes the following modules. A reception module is arranged to receive a channel measurement pilot signal from a base station. An acquisition module is arranged to acquire the channel information by performing channel measurement according to the channel measurement pilot signal. A calculation module is arranged to calculate a first type of information, a second type of information and a third type of information using the channel information, herein the first type of information includes information indicating N vectors u1, u2, . . . , uN, the second type of information includes indication information of P weighting amplitude information $A_1, A_2, \ldots A_P$, and the third type of information includes indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_B^B$; u1, u2, . . . uN, $A_1, A_2, \ldots A_P$ and $\varphi_1^A, \varphi_2^A, \ldots \varphi_P^A$ rrepresent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, . . . uN, $A_1$, $A_2$, . . . $A_P$, $\varphi_1^A$, $\varphi_2^A$, . . . $\varphi_P^A$), u1, u2, . . . uN, $A_1$, $A_2$, . . . $A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, . . . uN, $A_1$, $A_2, \ldots A_P$, $\varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2); and a feedback module configured to transmit the first indication information of the first type of information, the second indication information of the second type of information, and the third indication information of the third type of information to the base station.

According to another aspect of the embodiments of the present disclosure, there is provided another apparatus for precoding data.

The apparatus for precoding data according to the embodiments of the present disclosure includes the following modules. A reception module is arranged to receive first indication information of a first type of information, second indication information of a second type of information, and third indication information of a third type of information from a terminal, herein the first type of information includes information indicating N vectors u1, u2, . . . , uN, the second type of information includes indication information of P weighting amplitude information $A_1, A_2, \ldots A_P$, and the third type of information includes indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_P^B$; u1, u2, . . . uN, $A_1, A_2, \ldots A_P$ and $\varphi_1^A$, $\varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, . . . uN, $A_1$, $A_2$, . . . $A_P$, $\varphi_1^A$, $\varphi_2^A$, . . . $\varphi_P^A$), u1, u2, . . . uN, $A_1$, $A_2, \ldots A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, . . . uN, $A_1$, $A_2, \ldots A_P$, $\varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2). An acquisition module is arranged to acquire the first type of information according to the first indication information, the second type of information is acquired according to the second indication information, and the third type of information is acquired according to the third indication information. A calculation module is arranged to calculate DMatrix1 and DMatrix2 using the first type of information, the second type of information and the third type of information, and R or W are calculated through Q(DMatrix1, DMatrix2). And a precoding module is arranged to precode the data according to R or W.

With the embodiments of the present disclosure, a channel measurement pilot signal is received from a base station. The channel information is acquired by performing channel measurement according to the channel measurement pilot signal. CMatrix1 and CMatrix2 are calculated using the channel information, herein CMatrix1 and CMatrix2 are used to quantize the channel information or indicate the base station to perform precoding. And first indication information of CMatrix1 and/or second indication information of CMatrix2 are fed back to the base station, which solves the problem in the related technology that the designed feedback model is lack of considering the polarization leakage condition, and thereby as the influence due to the polarization leakage is considered in the feedback design, a significant performance gain exists in a case that the polarization leakage actually occurs.

BRIEF DESCRIPTION OF DRAWINGS

The accompanying drawings described herein are intended to provide a further understanding of the present disclosure and form a part of the present application, and the illustrative embodiments of the present disclosure and description thereof are used to explain the present disclosure, and are not intended to constitute improper definition of the present disclosure. In the accompanying drawings:

FIG. 5 is a flowchart of a method for precoding data according to an embodiment of the present disclosure.

DETAILED DESCRIPTION

The present disclosure will be described in detail below with reference to the accompanying drawings in combination with embodiments. It should be illustrated that, the embodiments in the present application and the features in the embodiments can be combined with each other without a conflict.

Figure 1:
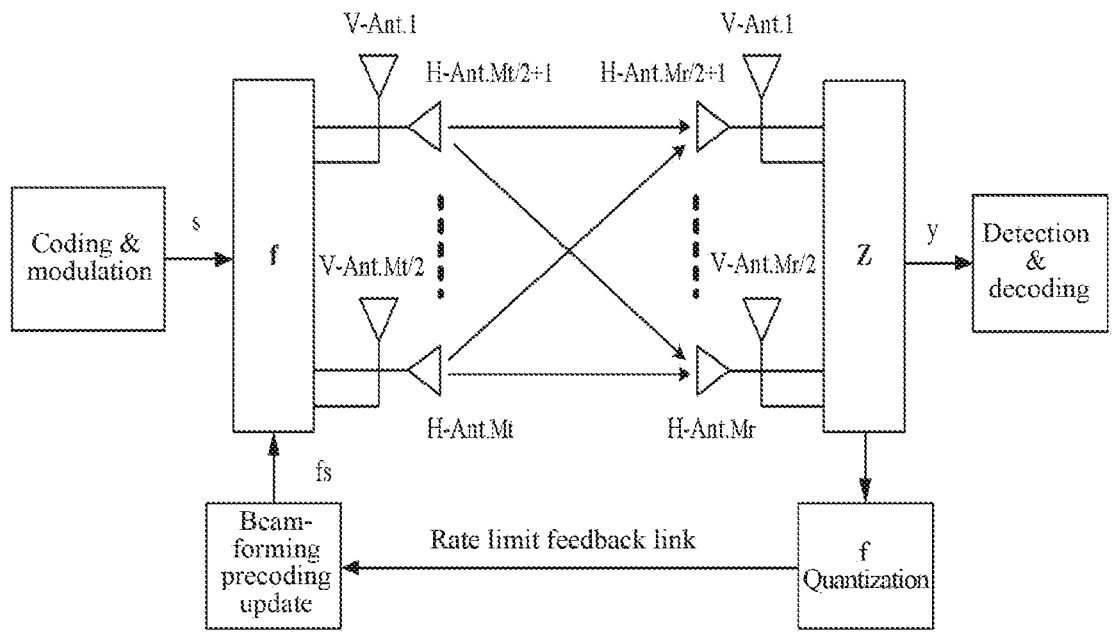
FIG. 1 is a diagram of Mt transmission antennas and Mr reception antennas existing in a dual-polarization system in the related technology.
Figure 2:
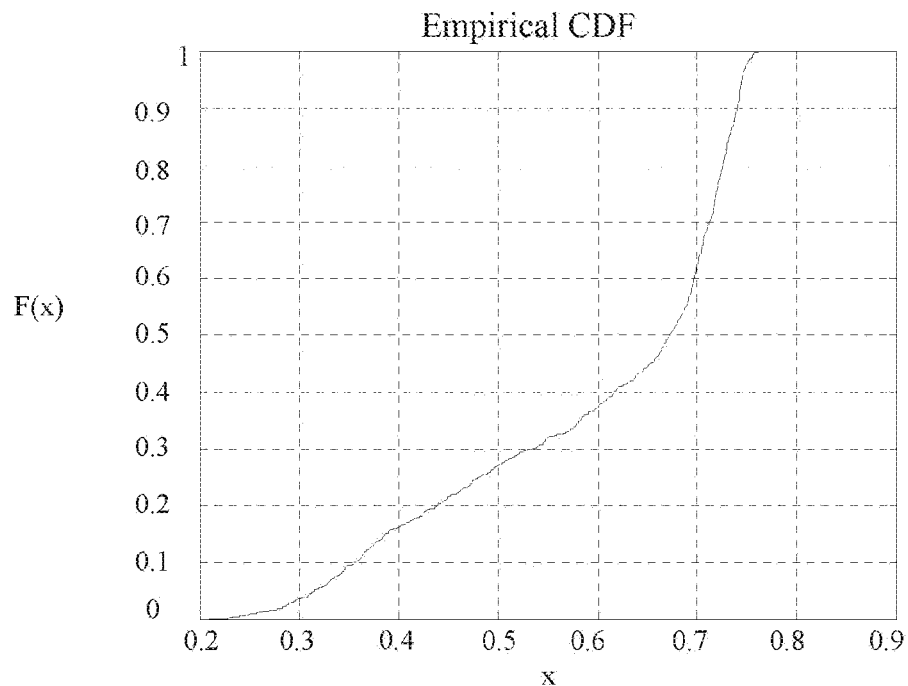
FIG. 2 is a diagram of CDF corresponding to 32Tx without considering a minimum quantization error (chordal distance) of polarization leakage in the related technology.
Figure 3:
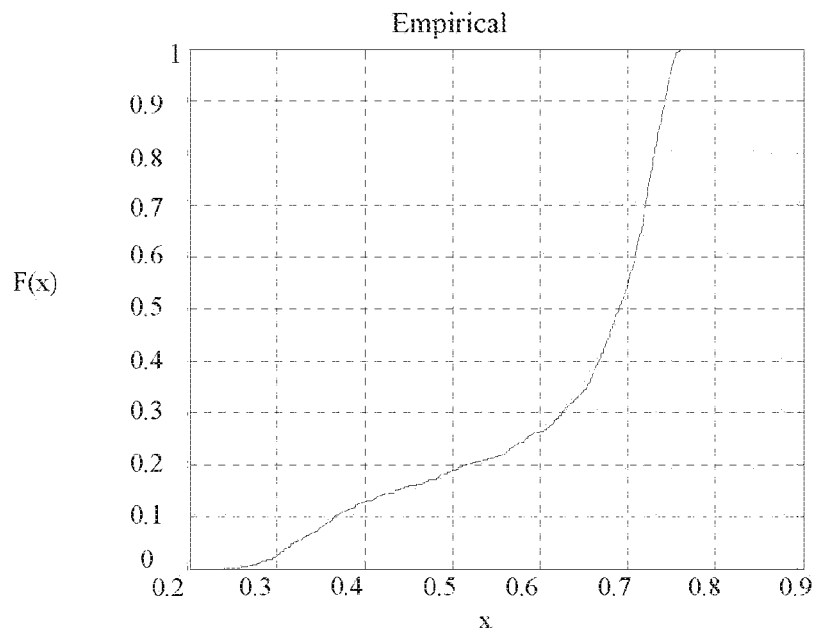
FIG. 3 is a diagram of CDF corresponding to 64Tx without considering a minimum quantization error (chordal distance) of polarization leakage in the related technology.
Figure 4:
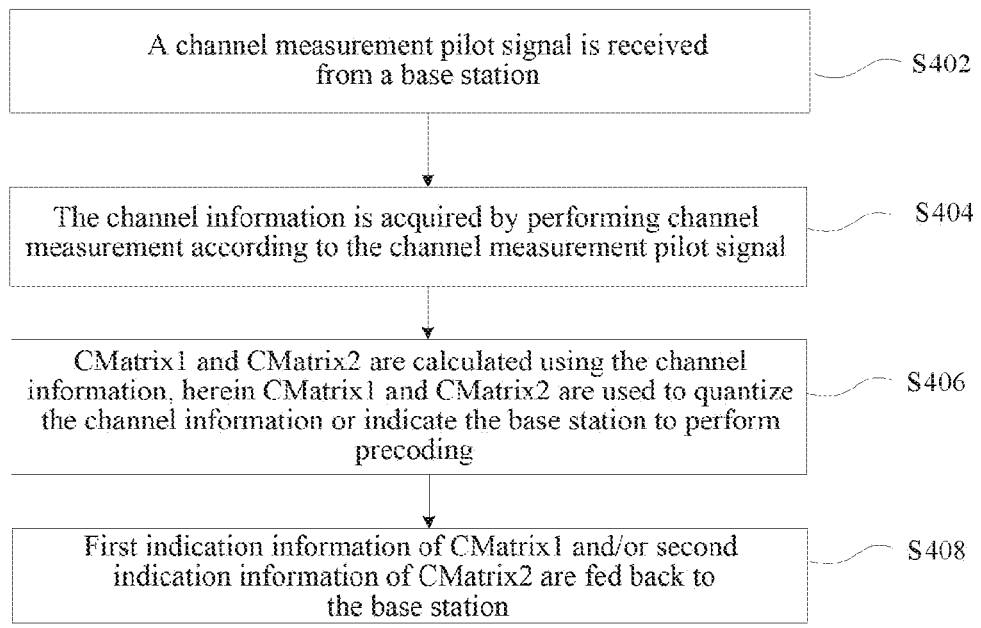
FIG. 4 is a flowchart of a method for quantizing and feeding back channel information according to an embodiment of the present disclosure.

FIG. 4 is a flowchart of a method for quantizing and feeding back channel information according to an embodiment of the present disclosure. As shown in FIG. 4, the method may include the following steps.

In step S402, a channel measurement pilot signal is received from a base station.

In step S404, the channel information is acquired by performing channel measurement according to the channel measurement pilot signal.

In step S406, CMatrix1 and CMatrix2 are calculated using the channel information, herein CMatrix1 and CMatrix2 are used to quantize the channel information or indicate the base station to perform precoding.

In step S408, first indication information of CMatrix1 and/or second indication information of CMatrix2 are fed back to the base station.

In the related technology, the designed feedback model is lack of considering the polarization leakage condition. With the method shown in FIG. 4, the problem in the related technology that the designed feedback model is lack of considering the polarization leakage condition is solved, and thereby as the influence due to the polarization leakage is considered in the feedback design, a significant performance gain exists in a case that the polarization leakage actually occurs.

It should be illustrated that for the matrixes mentioned in the embodiments of the present disclosure, as positions of column vector elements thereof are related to the antenna arrangement, any simultaneous row exchange for all the matrixes mentioned in the embodiments of the present disclosure does not affect the essence of these matrixes, which is an equivalent implementation. Furthermore, for the matrixes mentioned in the embodiments of the present disclosure, as positions of elements in row vectors thereof are related to layer mapping which may be implemented in various different manners, any simultaneous column exchange for all the matrixes mentioned in the embodiments of the present invention does not affect the essence of these matrixes, which is an equivalent implementation. In addition, for the matrixes mentioned in the embodiments of the present disclosure, only the directivity problem thereof is concerned, and therefore, for all matrixes to be multiplied by any complex coefficient at the same time, only the transmission power thereof is affected because the direction thereof does not change, which may therefore be considered as an equivalent implementation.

In an alternative embodiment, CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as
a model, and CMatrix2 is a matrix with $$\begin{bmatrix} V_i & \alpha V_j \\ V_i & -\beta V_i \end{bmatrix} \text{ or } \begin{bmatrix} 0 & V_j \\ V_i & 0 \end{bmatrix}$$

as a model; and $V_n$, $V_m$, $V_i$ or $V_j$ may be but is not limited to one of the following:

(1) a vector with Mt/2 rows and floor(r/2) columns, (2) an orthogonal matrix with Mt/2 rows and floor(r/2) columns, and (3) an orthogonal matrix with Mt/2 rows and floor(r/2)+1 columns, herein Mt is the number of transmission antennas, floor (r/2) represents round down of r/2, r represents information of a number of transmission layers or rank information, and a, $\alpha$ and $\beta$ are complex values.

In an exemplary embodiment, in step S406, after calculating CMatrix1 and CMatrix2 using the channel information, the following operations may be further included.

In step S1, a third matrix CMatrix is built through a function F(CMatrix1,CMatrix2,θ,κ), herein CMatrix is used to represent the quantized channel characteristic information or indicate the base station to perform precoding, θ is a phase, and κ is a real value.

In an alternative implementation, θ is a phase parameter which is determined by the base station and is notified by high layer configuration signaling, or θ is calculated according to the channel information and third indication information of θ is fed back to the base station.

In an alternative implementation, κ is a proportional parameter which is determined by the base station and is notified by high layer configuration signaling, or κ is calculated according to the channel information and fourth indication information of κ is fed back to the base station.

In an exemplary embodiment, CMatrix1 is fed back using a first codebook CB1, herein a codeword model included in CB1 is $$\begin{bmatrix} V_n & V_m \\ aV_n & -aV_m \end{bmatrix} \text{ or } \begin{bmatrix} V_n & 0 \\ 0 & V_m \end{bmatrix}.$$

In an alternative implementation, a value of a is 1 and/or j.

In an exemplary embodiment, CMatrix1 is jointly indicated and determined by I1 which is composed of a plurality of PMIs.

In an exemplary embodiment, CMatrix2 is fed back using CB2, herein a codeword model included in CB2 is $$\begin{bmatrix} V_i & \alpha V_j \\ V_i & -\beta V_i \end{bmatrix} \text{ or } \begin{bmatrix} 0 & V_j \\ V_i & 0 \end{bmatrix}.$$

In an alternative implementation, values of α and β are 1.

In an exemplary embodiment, CMatrix2 is jointly indicated and determined by I2 which is composed of a plurality of PMIs.

In an alternative implementation, I1 and I2 at least comprise one identical index.

In an exemplary embodiment, F(CMatrix1, CMatrix2,θ,κ)=CMatrix1+$e^{j\theta}$*f(κ)*CMatrix2, herein f(κ) is a function with an argument of κ.

In an alternative implementation, f(κ) may be but is not limited to one of the following:

$$f(\kappa) = \left(\frac{1}{\kappa}\right)^q; \quad (1)$$

$$f(\kappa) = \left(\frac{1}{\sqrt{\kappa}}\right)^q; \quad (2)$$

$$f(\kappa) = \left(\frac{1+\kappa}{\sqrt{\kappa}}\right)^q; \quad (3)$$

$$f(\kappa) = \left(\frac{1}{\sqrt{\kappa}+\kappa}\right)^q; \quad (4)$$

herein q is a real value greater than 0.

In an alternative implementation, q=0.5, 1 or 2.

FIG. 5 is a flowchart of a method for precoding data according to an embodiment of the present disclosure. As shown in FIG. 5, the method may comprise the following processing steps.

In step S502, an indication information set is received from a terminal, herein the indication information set includes one of the following information. First indication information of a first matrix CMatrix1 and second indication information of a second matrix CMatrix2, the first indication information, the second indication information and third indication information of a phase θ, and the first indication information, the second indication information, the third indication information and fourth indication information of a proportion κ.

In step S504, when the indication information set includes the first indication information and the second indication information, CMatrix1 is acquired through the first indication information and CMatrix2 is acquired through the second indication information. Or when the indication information set includes the first indication information, the second indication information and the third indication information of the phase θ, CMatrix1 is acquired through the first indication information, CMatrix2 is acquired through the second indication information, and θ is acquired through the third indication information. Or when the indication information set includes the first indication information, the second indication information, the third indication information and the fourth indication information, CMatrix1 is acquired through the first indication information, CMatrix2 is acquired through the second indication information, θ is acquired through the third indication information, and κ is acquired through the fourth indication information.

In step S506, when the indication information set includes the first indication information and the second indication information, a third matrix CMatrix is calculated according to a function F(CMatrix1,CMatrix2,θ,κ) which is previously agreed with the terminal using the acquired CMatrix1 and CMatrix2 and θ and κ which are predetermined and issued to the terminal. Or when the indication information set includes the first indication information, the second indication information and the third indication information of the phase θ, CMatrix is calculated according to the function F(CMatrix1,CMatrix2,θ,κ) using the acquired CMatrix1 and CMatrix2, θ and κ which is predetermined and issued to the terminal. Or when the indication information set includes the first indication information, the second indication information, the third indication information and the fourth indication information, CMatrix is calculated according to the function F(CMatrix1,CMatrix2,θ,κ) using the acquired CMatrix1 and CMatrix2, θ and κ.

In step S508, the data is precoded using CMatrix.

Figure 6:
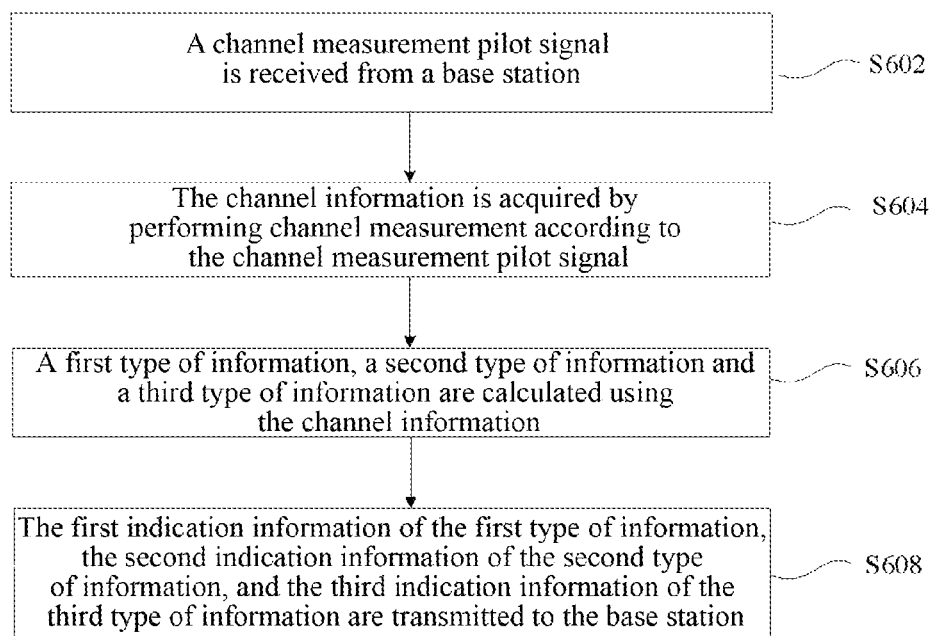
FIG. 6 is a flowchart of another method for quantizing and feeding back channel information according to an embodiment of the present disclosure.

FIG. 6 is a flowchart of another method for quantizing and feeding back channel information according to an embodiment of the present disclosure. As shown in FIG. 6, the method may includes the following processing steps.

In step S602, a channel measurement pilot signal is received from a base station.

In step S604, the channel information is acquired by performing channel measurement according to the channel measurement pilot signal.

In step S606, a first type of information, a second type of information and a third type of information are calculated using the channel information, herein the first type of information includes information indicating N vectors u1, u2, ..., uN, the second type of information includes indication information of P weighting amplitude information $A_1, A_2, \ldots A_P$, and the third type of information includes indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_P^B$; u1, u2, ...uN, $A_1, A_2, \ldots A_P$ and $\varphi_1^A, \varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, ... uN, $A_1, A_2, \ldots A_P, \varphi_1^A, \varphi_2^A, \ldots \varphi_P^A$), u1, u2, ... uN, $A_1, A_2, \ldots A_P$ and $\varphi_1^B, \varphi_2^B, \ldots \varphi_P^B$ and represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, ... uN, $A_1, A_2, \ldots A_P, \varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2).

In step S608, the first indication information of the first type of information, the second indication information of the second type of information, and the third indication information of the third type of information are transmitted to the base station.

Figure 7:
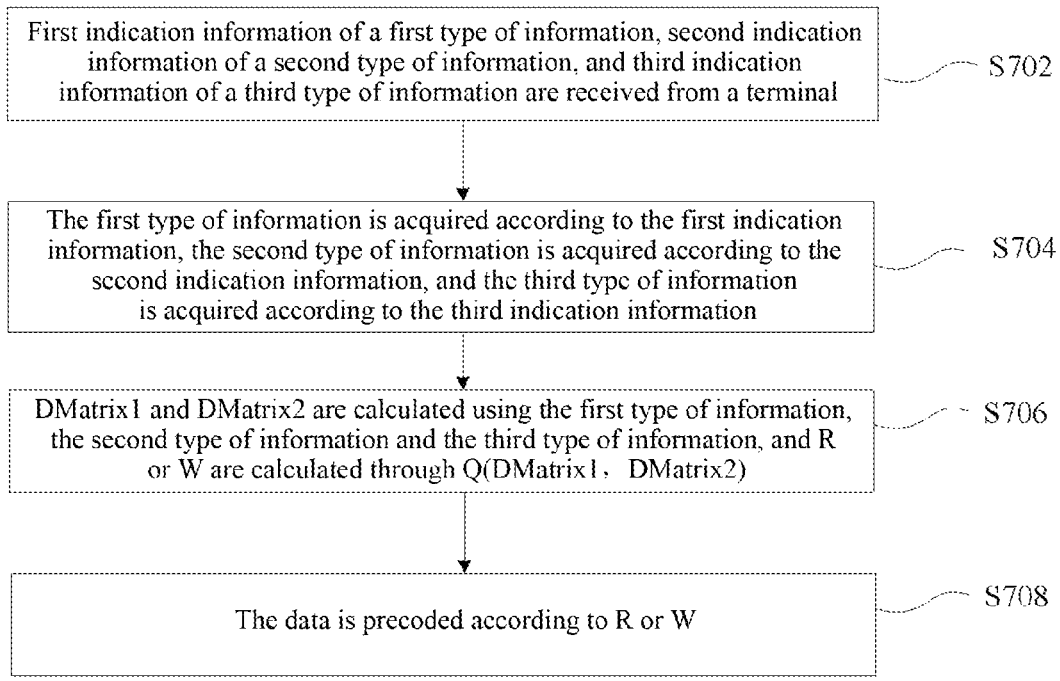
FIG. 7 is a flowchart of another method for precoding data according to an embodiment of the present disclosure.

FIG. 7 is a flowchart of another method for precoding data according to an embodiment of the present disclosure. As shown in FIG. 7, the method may include the following processing steps.

In step S702, first indication information of a first type of information, second indication information of a second type of information, and third indication information of a third type of information are received from a terminal, herein the first type of information comprises information indicating N vectors u1, u2, . . . , uN, the second type of information includes indication information of P weighting amplitude information $A_1, A_2, \ldots A_P$, and the third type of information includes indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_P^B$; u1, u2 . . . uN, $A_1, A_2, \ldots A_P$ and $\varphi_1^A, \varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, . . . uN, $A_1$, $A_2$, . . . $A_P$, $\varphi_1^A, \varphi_2^A, \ldots \varphi_P^A$) u1, u2, . . . uN, $A_1$, $A_2$, . . . $A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, . . . uN, $A_1$, $A_2$, . . . $A_P$, $\varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2).

In step S704, the first type of information is acquired according to the first indication information, the second type of information is acquired according to the second indication information, and the third type of information is acquired according to the third indication information.

In step S706, DMatrix1 and DMatrix2 are calculated using the first type of information, the second type of information and the third type of information, and R or W are calculated through Q(DMatrix1, DMatrix2).

In step S708, the data is precoded according to R or W.

For the channel information, generally, the concerned content is primarily a right singular vector of the channel matrix H. Therefore, a research may actually be made on $R=H^H H$, and the right singular vector of H is actually equal to an eigenvector of $H^H H$, herein an expression of $H^H H$ is as follows:

$$H^H H = H_x^H H_x + \kappa H_z^H H_z + \sqrt{\kappa}(H_z^H H_x + H_x^H H_z)$$

For configuration in a case of vertical and horizontal polarized antennas at the transmitting end, it can be found through analysis that $H_x^H H_x$, $H_z^H H_z$ and $H_z^H H_x + H_x^H H_z$ are block diagonal matrix, herein $H_x^H H_x$ is a block diagonal matrix, and $H_z^H H_z$ and $H_z^H H_x + H_x^H H_z$ are off-Block diagonal matrixes.

$$\begin{aligned} H^H H &= H_x^H H_x + \kappa H_z^H H_z + \sqrt{\kappa}(H_z^H H_x + H_x^H H_z) \\ &= \begin{bmatrix} X_1 & 0 \\ 0 & X_2 \end{bmatrix} + \kappa \begin{bmatrix} 0 & X_4 \\ X_3 & 0 \end{bmatrix} + \sqrt{\kappa} \begin{bmatrix} 0 & X_6 \\ X_5 & 0 \end{bmatrix} \\ &= \begin{bmatrix} X_1 & 0 \\ 0 & X_2 \end{bmatrix} + \begin{bmatrix} 0 & \kappa X_4 + \sqrt{\kappa} X_6 \\ \kappa X_3 + \sqrt{\kappa} X_5 & 0 \end{bmatrix} \end{aligned}$$

Therefore, there are the following several feedback manners.

In a first manner, eigenvectors of various matrixes $$H_x^H H_x = \begin{bmatrix} X_1 & 0 \\ 0 & X_2 \end{bmatrix} \text{ and}$$

$$\kappa H_z^H H_z + \sqrt{\kappa}(H_z^H H_x + H_x^H H_z) = \begin{bmatrix} 0 & \kappa X_4 + \sqrt{\kappa} X_6 \\ \kappa X_3 + \sqrt{\kappa} X_5 & 0 \end{bmatrix}$$

are fed back, and are weighted and combined to acquire the eigenvector of $H^H H$. It can be known through analysis that an eigenvector model of the block diagonal matrix $$H_x^H H_x \text{ is } \begin{bmatrix} V_n & 0 \\ 0 & V_n \end{bmatrix},$$

an eigenvector model of $H_z^H H_z + (H_z^H H_x + H_x^H H_z)$ which is an off-block diagonal matrix is $$\begin{bmatrix} 0 & V_j \\ V_i & 0 \end{bmatrix},$$

the weighting and combining coefficients are related to the eigenvalues of $H_x^H H_x$, and $H_z^H H_z + (H_z^H H_x + H_x^H H_z)$, and the eigenvalues thereof are related to a size of κ in a statistical sense, and is a function of κ, or eignenvectors of a part of matrixes $$H_x^H H_x = \begin{bmatrix} X_1 & 0 \\ 0 & X_2 \end{bmatrix}, \text{ and } (H_z^H H_x + H_x^H H_z) = \sqrt{\kappa} \begin{bmatrix} 0 & X_6 \\ X_5 & 0 \end{bmatrix}$$

are fed back, and are weighted and combined to acquire an approximate eigenvector of $H^H H$.

It can be known through analysis that an eigenvector model of the block diagonal matrix $$H_x^H H_x \text{ is } \begin{bmatrix} V_n & 0 \\ 0 & V_m \end{bmatrix},$$

an eigenvector model of $(H_z^H H_x + H_x^H H_z)$ which is an off-block diagonal matrix is $$\begin{bmatrix} 0 & V_j \\ V_i & 0 \end{bmatrix},$$

the weighting and combining coefficients are related to the eigenvalues of $H_x^H H_x$, and $(H_z^H H_x + H_x^H H_z)$, and the eigenvalues thereof are related to a size of κ in a statistical sense, and is a function of κ, eigenvectors of a part of matrixes $$H_x^H H_x = \begin{bmatrix} X_1 & 0 \\ 0 & X_2 \end{bmatrix}, \text{ and } H_z^H H_z = \kappa \begin{bmatrix} 0 & X_4 \\ X_3 & 0 \end{bmatrix}$$

are fed back, and are weighted and combined to acquire an approximate eigenvector of $H^H H$.

It can be known through analysis that an eigenvector model of the block diagonal matrix $$H_x^H H_x \text{ is } \begin{bmatrix} V_n & 0 \\ 0 & V_m \end{bmatrix},$$

an eigenvector model of $H_z^H H_z$ which is an off-block diagonal matrix is $$\begin{bmatrix} 0 & V_j \\ V_i & 0 \end{bmatrix},$$

the weighting and combining coefficients are related to the eigenvalues of $H_x^H H_x$, $H_z^H H_z$ and the eigenvalues thereof are related to a size of κ in a statistical sense, and is a function of κ.

In a second manner, as X1-X6 are channel responses due to some identical multi-path components, for multi-path amplitude, the directions may use the same information. The difference is merely in that during weighting and combining, multi-path phases may be different due to different polarization directions and different polarization leakage characteristics. Therefore, $H_x^H H_x$, $H_z^H H_z$, $(H_z^H H_x + H_x^H H_z)$ may be built using a feedback method for one set of amplitude information, one set of direction information, and multiple sets of phase information for feedback.

For configuration in a case of +/−45 degree polarized antennas at the transmitting end, it can be found through analysis that $$H^H H = H_x^H H_x + \kappa H_z^H H_z + \sqrt{\kappa}(H_z^H H_x + H_x^H H_z)$$
$$= \begin{bmatrix} X_1 & X_2 \\ X_2 & X_1 \end{bmatrix} + \kappa \begin{bmatrix} X_3 & X_4 \\ X_4 & X_3 \end{bmatrix} + \sqrt{\kappa} \begin{bmatrix} X_5 & X_6 \\ X_6 & -X_5 \end{bmatrix}$$

The above exemplary implementations will be further described below in conjunction with exemplary embodiment one to exemplary embodiment six.

Exemplary Embodiment One

A base station transmits a channel measurement pilot. By taking Nt transmission antenna as an example, there are Nt/2 antennas in two mutually perpendicular polarization directions respectively. The base station transmits a set of CSI-RS pilots with a total number of Nt ports. A terminal receives pilot configuration information transmitted by the base station and detects at a corresponding resource location to acquire the information of an Nr×Nt-dimensional channel matrix H. Here, Nr is a number of reception antennas.

The terminal and the base station may previously agree on using the following function to characterize eigenvector information or precoding information of the channel matrix.

The eigenvector or the optimal precoding W=F(CMatrix1,CMatrix2,θ,κ);

An expression form of the function is as follows:

F(CMatrix1,CMatrix2,θ,κ)=CMatrix1+$e^{jθ}$*f(κ)*CMatrix2, herein f(κ) is a function with an argument of κ.

In an exemplary implementation, the above function f(κ) may be one of:

$$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, f(\kappa) = \left(\frac{1}{\sqrt{\kappa}+\kappa}\right)^q,$$

herein q is a real number greater than 0, and in the exemplary embodiment, a value of q is preferably equal to 0.5, 1 or 2.

The terminal only needs to calculate and feed back information of the best CMatrix1, CMatrix2, θ, and k according to information of the measured H. The method is to simulate a receiving process according to the received weight value, and by traversing parameters such as CMatrix1, CMatrix2, θ, k etc. to achieve optimal values under a certain criterion. The criterion may be to maximize a signal-interference and noise ratio, minimize an error etc. Thus, the optimal W under a selected criterion can be characterized by an agreed function, and the base station can perform a precoding process on the data based on W.

For example, in a case that a rank is 2 or a number of transmission layers is 2, CMatrix1 may be a codeword in the following codebook, the terminal performs codeword selection and feedback based on the codebook, and $i_1$ and $i_2$ collectively indicate a codeword with a model of $$\frac{1}{\sqrt{2}} \begin{bmatrix} v_m & v_{m'} \\ \phi_n v_m & -\phi_n v_{m'} \end{bmatrix},$$

$i_1$ and $i_2$ form an index set I1, and require 4 bit indication signaling for feedback respectively, and $v_m$ and $v_{m'}$ are Mt/2-dimensional vectors here, of which specific models may be determined according to correlation between channels and a shape of an antenna array. For example, if related 2D MIMO (linear array antenna arrangement, which only supports vertical or horizontal dimensional beamforming) is considered and compared, $v_m$ and $v_{m'}$ may be DFT vectors, with a mathematical form of:

$$v_m = [1 \ e^{j2\pi m/32} \ldots e^{j(Nt-2)\pi m/32}]^T, v_{m'} = [1 \ e^{j2\pi m'/32} \ldots e^{j(Nt-2)\pi m'/32}]^T;$$

if 3D MIMO (matrix antenna arrangement, which supports both vertical and horizontal dimensional beamforming) is considered, $v_m$ and $v_{m'}$ may be a Kroneck product form of two DFT vectors, and if non-correlated channels are considered, $v_m$ and $v_{m'}$ may be codewords in an Mt/2-dimensional Gransmannian codebook. A number of codewords may be determined according to requirements for the accuracy of the feedback. As shown in table 5,

TABLE 5

| $i_1$ | $i_2$ | |
|---|---|---|
| | 0 | 1 |
| 0-15 | $W_{2i_1,2i_1,0}^{(2,CMatrix1)}$ | $W_{2i_1,2i_1,1}^{(2,CMatrix1)}$ |

| $i_1$ | $i_2$ | |
|---|---|---|
| | 2 | 3 |
| 0-15 | $W_{2i_1+1,2i_1+1,0}^{(2,CMatrix1)}$ | $W_{2i_1+1,2i_1+1,1}^{(2,CMatrix1)}$ |

| $i_1$ | $i_2$ | |
|---|---|---|
| | 4 | 5 |
| 0-15 | $W_{2i_1+2,2i_1+2,0}^{(2,CMatrix1)}$ | $W_{2i_1+2,2i_1+2,1}^{(2,CMatrix1)}$ |

| $i_1$ | $i_2$ | |
|---|---|---|
| | 6 | 7 |
| 0-15 | $W_{2i_1+3,2i_1+3,0}^{(2,CMatrix1)}$ | $W_{2i_1+3,2i_1+3,1}^{(2,CMatrix1)}$ |

| $i_1$ | $i_2$ | |
|---|---|---|
| | 8 | 9 |
| 0-15 | $W_{2i_1,2i_1+1,0}^{(2,CMatrix1)}$ | $W_{2i_1,2i_1+1,1}^{(2,CMatrix1)}$ |

| $i_1$ | $i_2$ | |
|---|---|---|
| | 10 | 11 |
| 0-15 | $W_{2i_1+1,2i_1+2,0}^{(2,CMatrix1)}$ | $W_{2i_1+1,2i_1+2,1}^{(2,CMatrix1)}$ |

| $i_1$ | $i_2$ | |
|---|---|---|
| | 12 | 13 |
| 0-15 | $W_{2i_1,2i_1+3,0}^{(2,CMatrix1)}$ | $W_{2i_1,2i_1+3,1}^{(2,CMatrix1)}$ |

| $i_1$ | $i_2$ | |
|---|---|---|
| | 14 | 15 |
| 0-15 | $W_{2i_1+1,2i_1+3,0}^{(2,CMatrix1)}$ | $W_{2i_1+1,2i_1+3,1}^{(2,CMatrix1)}$ | where $W_{m,m',n}^{(2,CMatrix1)} = \frac{1}{\sqrt{2}} \begin{bmatrix} v_m & v_{m'} \\ \phi_n v_m & -\phi_n v_{m'} \end{bmatrix}$, $\phi_n = e^{j\pi n/2}$ CMatrix2 may be selected from a codebook with all codewords complying with a model of $$W_{q,q',n}^{(2)} = \frac{1}{\sqrt{2}} \begin{bmatrix} v_q & v_{q'} \\ v_{q'} & v_q \end{bmatrix},$$

for example, CMatrix2 may be a codeword in the following codebook, the terminal performs codeword selection and feedback based on the codebook, and $i_3$ and $i_4$ collectively indicate a codeword with a model of $$W_{q,q',n}^{(2)} = \frac{1}{\sqrt{2}} \begin{bmatrix} v_q & v_{q'} \\ v_{q'} & v_q \end{bmatrix},$$

$i_3$ and $i_4$ form an index set I2, and require 3 bit indication signaling for feedback respectively, and $v_q$ and $v_{q'}$ are Mt/2-dimensional vectors here, of which specific models may be determined according to correlation between channels and 2D or 3D MIMO. For example, if related 2D MIMO (linear array antenna arrangement, which supports only vertical or horizontal dimensional beamforming) is considered and compared, $v_q$ and $v_{q'}$ may be DFT vectors, with a mathematical form of:

$$v_q = [1 \ e^{j2\pi q/32} \ \ldots \ e^{j(Nt-2)\pi q/32}]^T, \ v_{q'} = [1 \ e^{j2\pi q'/32} \ \ldots \ e^{j(Nt-2)\pi q'/32}]^T;$$

if 3D MIMO (matrix antenna arrangement, which support both vertical and horizontal dimensional beamforming) is considered, $v_q$ and $v_{q'}$ may be a Kroneck product form of two DFT vectors, and if non-correlated channels are considered, $v_q$ and $v_{q'}$ may be codewords in an Mt/2-dimensional Gransmannian codebook. The number of codewords may be determined according to requirements for the accuracy of the feedback. However, generally, a sum of feedback overhead of $i_3$ and $i_4$ is less than a sum of feedback overhead of $i_1$ and $i_2$. As shown in table 6,

TABLE 6

| $i_3$ | $i_4$ | |
|---|---|---|
| | 0 | 1 |
| 0-15 | $W_{2i_3,2i_3,0}^{(2,CMatrix2)}$ | $W_{2i_3,2i_3,1}^{(2,CMatrix2)}$ |

| $i_3$ | $i_4$ | |
|---|---|---|
| | 2 | 3 |
| 0-15 | $W_{2i_3+1,2i_3+1,0}^{(2,CMatrix2)}$ | $W_{2i_3+1,2i_3+1,1}^{(2,CMatrix2)}$ |

| $i_3$ | $i_4$ | |
|---|---|---|
| | 4 | 5 |
| 0-15 | $W_{2i_3+2,2i_3+2,0}^{(2,CMatrix2)}$ | $W_{2i_3+2,2i_3+2,1}^{(2,CMatrix2)}$ |

| $i_3$ | $i_4$ | |
|---|---|---|
| | 6 | 7 |
| 0-15 | $W_{2i_3+3,2i_3+3,0}^{(2,CMatrix2)}$ | $W_{2i_3+3,2i_3+3,1}^{(2,CMatrix2)}$ | where $W_{q,q',n}^{(2)} = \frac{1}{\sqrt{2}} \begin{bmatrix} v_q & v_{q'} \\ v_{q'} & v_q \end{bmatrix}$, $\phi_n = e^{j\pi n/2}$ possibly in a case that a rank is 4 or a number of transmission layers is 4, CMatrix1 may be a codeword in the following codebook, and the terminal performs codeword selection and feedback based on the codebook. As shown in table 7,

TABLE 7

| $i_1$ | $i_2$ | |
|---|---|---|
| | 0 | 1 |
| 0-3 | $W_{8i_1,8i_1+8,0}^{(4,CMatrix1)}$ | $W_{8i_1,8i_1+8,1}^{(4,CMatrix1)}$ |

| $i_1$ | $i_2$ | |
|---|---|---|
| | 2 | 3 |
| 0-3 | $W_{8i_1+2,8i_1+10,0}^{(4,CMatrix1)}$ | $W_{8i_1+2,8i_1+10,1}^{(4,CMatrix1)}$ |

| $i_1$ | $i_2$ | |
|---|---|---|
| | 4 | 5 |
| 0-3 | $W_{8i_1+4,8i_1+12,0}^{(4,CMatrix1)}$ | $W_{8i_1+4,8i_1+12,1}^{(4,CMatrix1)}$ |

TABLE 7-continued

| | $i_2$ | |
|---|---|---|
| $i_1$ | 6 | 7 |
| 0-3 | $W_{8i_1+6,8i_1+14,0}^{(4,CMatrix1)}$ | $W_{8i_1+6,8i_1+14,1}^{(4,CMatrix1)}$ | where $W_{m,m',n}^{(4)} = \dfrac{1}{\sqrt{32}} \begin{bmatrix} v_m & v_{m'} & v_m & v_{m'} \\ \phi_n v_m & \phi_n v_{m'} & -\phi_n v_m & -\phi_n v_{m'} \end{bmatrix}$ The index set I1 may include $i_1$ and $i_2$, which require 2 bit and 3 bit indication signaling for feedback, and vm and vm' are Mt/2-dimensional vectors here, of which specific models may be determined according to correlation between channels and 2D or 3D MIMO. For example, if related 2D MIMO (linear array antenna arrangement, which supports only vertical or horizontal dimensional beamforming) is considered and compared, $v_m$ and $v_{m'}$ may be DFT vectors, and if 3D MIMO (matrix antenna arrangement, which support both vertical and horizontal dimensional beamforming) is considered, $v_m$ and $v_{m'}$ may be a Kroneck product form of two DFT vectors, and if non-correlated channels are considered, $v_m$ and $v_{m'}$ may be codewords in an Mt/2-dimensional Gransmannian codebook. The number of codewords may be determined according to requirements for the accuracy of the feedback.

CMatrix2 may be a codeword in the following codebook, and the terminal performs codeword selection and feedback based on the codebook. As shown in table 8,

TABLE 8

| | $i_4$ | |
|---|---|---|
| $i_3$ | 0 | 1 |
| 0-3 | $W_{8i_3,8i_3+8,8i_3+14,8i_3+6}^{(4,CMatrix2)}$ | $W_{8i_3+2,8i_3+10,8i_3,8i_3+8}^{(4,CMatrix2)}$ |
| | $i_4$ | |
| $i_3$ | 2 | 3 |
| 0-3 | $W_{8i_3+4,8i_3+12,8i_3+2,8i_3+10}^{(4,CMatrix2)}$ | $W_{8i_3+6,8i_3+14,8i_3+4,8i_3+12}^{(4,CMatrix2)}$ | where $W_{m1,m1',m2,m2'}^{(4,CMatrix2)} = \dfrac{1}{\sqrt{32}} \begin{bmatrix} v_{m1} & v_{m2} & v_{m1'} & v_{m2'} \\ v_{m1'} & v_{m2'} & -v_{m1} & -v_{m2} \end{bmatrix}$ The index set I2 may include $i_3$ and $i_4$, which require 2 bit indication signaling for feedback, where $v_{m1}$, $v_{m2}$, $v_{m1'}$, and $v_{m2'}$, are Mt/2-dimensional vectors, of which specific models may be determined according to correlation between channels and 2D or 3D MIMO. For example, if related 2D MIMO (linear array antenna arrangement, which supports only vertical or horizontal dimensional beamforming) is considered and compared, $v_{m1}$, $v_{m2}$, $v_{m1'}$, and $v_{m2'}$ may be DFT vectors, and if 3D MIMO (matrix antenna arrangement, which support both vertical and horizontal dimensional beamforming) is considered, $v_{m1}$, $v_{m2}$, $v_{m1'}$, and $v_{m2'}$ may be a Kroneck product form of two DFT vectors, and if non-correlated channels are considered, $V_{m1}$, $V_{m2}$, $V_{m1'}$, and $v_{m2'}$ may be codewords in an Mt/2-dimensional Gransmannian codebook. The number of codewords may be determined according to requirements for the accuracy of the feedback. However, generally, a sum of feedback overhead of $i_3$ and $i_4$ is less than a sum of feedback overhead of $i_1$ and $i_2$.

In addition to CMatrix1 and CMatrix2, the terminal also needs to calculate the phase information θ, and the proportion information κ, and the phase information θ may be characterized by $e^{jθ}$. $e^{jθ}$ may be quantized by a codebook such as a 2 bit codebook {1j −1 −j} or a 3 bit codebook {1 j −1 −j q0 q1 q2 q3}, herein $q0=(1+j)/\sqrt{2}$; $q1=(-1+j)/\sqrt{2}$; and $q2=(-1-j)/\sqrt{2}$; $q3=(1-j)/\sqrt{2}$.

Of course, κ may also be quantified using a codebook, for example, [−4 dB, −5 dB−6 dB, −8 dB].

After the terminal calculates the above information of CMatrix1, CMatrix2, θ and κ, index information which indicates the information is fed back on an uplink channel. All the codebooks are stored at both the transmitting end and receiving end. Therefore, after the base station receives the indication information, the base station can find the corresponding information of CMatrix1, CMatrix2, θ, according to the same codebook, and then acquire eigenvector information or precoding information CMatrix, i.e. W selected by the terminal, according to a previously agreed function F(CMatrix1,CMatrix2, θ, κ).

Thereby, the base station can use W for precoding.

Exemplary Embodiment Two

A base station transmits a channel measurement pilot. By taking Nt transmission antenna as an example, there are Nt/2 antennas in two mutually perpendicular polarization directions respectively. The base station transmits a set of CSI-RS pilots with a total number of Nt ports. A terminal acquires pilot configuration information transmitted by the base station and detects at a corresponding resource location to acquire the information of an Nr×Nt-dimensional channel matrix H. Here, Nr is a number of reception antennas.

The terminal and the base station previously agree on using the following function to characterize eigenvector information or precoding information of the channel matrix.

The eigenvector/optimal precoding W=F(CMatrix1,CMatrix2,θ,κ);

An expression form of the function is as follows:

F(CMatrix1,CMatrix2,θ,κ)=CMatrix1+$e^{jθ}$*f(κ)*CMatrix2, herein f(κ) is a function with an argument of κ.

In an alternative implementation, the above function f(κ) may be one of:

$$f(\kappa) = \left(\dfrac{1}{\kappa}\right)^q, f(\kappa) = \left(\dfrac{1}{\sqrt{\kappa}}\right)^q, f(\kappa) = \left(\dfrac{1+\kappa}{\sqrt{\kappa}}\right)^q, f(\kappa) = \left(\dfrac{1}{\sqrt{\kappa}+\kappa}\right)^q,$$

herein q is a real number greater than 0, and in the alternative embodiment, a value of q is alternatively equal to 0.5, 1 or 2.

The terminal only needs to calculate and feed back information of the best CMatrix1, CMatrix2, θ, and k according to information of the measured H. The method is to simulate a receiving process according to the received weight value, and by traversing parameters such as CMatrix1, CMatrix2, θ, k etc. to achieve optimal values under a certain criterion. The criterion may be to maximize a signal-interference and noise ratio, minimize an error, etc. Thus, the optimal W under a selected criterion can be characterized by an agreed function, and the base station can perform a precoding process on the data based on W.

For example, in a case that a rank is 2 or a number of transmission layers is 2, CMatrix1 may be a codeword in the following codebook, the terminal performs codeword selection and feedback based on the codebook, and $i_1$ and $i_2$ collectively indicate a codeword with a model of $$\begin{bmatrix} v_m & 0 \\ 0 & v_{m'} \end{bmatrix},$$

$i_1$ and $i_2$ form an index set I1, and require 4 bit and 3 bit indication signaling for feedback respectively, and $v_m$ and $v_{m'}$ are Mt/2-dimensional vectors here, of which specific models may be determined according to correlation between channels and a shape of an antenna array. For example, if related 2D MIMO (linear array antenna arrangement, which only supports vertical or horizontal dimensional beamforming) is considered and compared, $v_m$ and $v_{m'}$ may be DFT vectors, with a mathematical form of:

$$v_m = [1\ e^{j2\pi m/32}\ \ldots\ e^{j(Nt-2)\pi m/32}]^T,\ v_{m'} = [1\ e^{j2\pi m'/32}\ \ldots\ e^{j(Nt-2)\pi m'/32}]^T;$$

if 3D MIMO (matrix antenna arrangement, which supports both vertical and horizontal dimensional beamforming) is considered, $v_m$ and $v_{m'}$ may be a Kroneck product form of two DFT vectors, and if non-correlated channels are considered, $v_m$ and $v_{m'}$ may be codewords in an Mt/2-dimensional Gransmannian codebook. The number of codewords may be determined according to requirements for the accuracy of the feedback. As shown in table 9,

TABLE 9

| | $i_2$ | | |
|---|---|---|---|
| $i_1$ | 0 | 1 | 2 |
| 0-15 | $W_{2i_1,2i_1}^{(2,CMatrix1)}$ | $W_{2i_1+1,2i_1+1}^{(2,CMatrix1)}$ | $W_{2i_1+2,2i_1+2}^{(2,CMatrix1)}$ |

| | $i_2$ | | |
|---|---|---|---|
| $i_1$ | 3 | 4 | 5 |
| 0-15 | $W_{2i_1+3,2i_1+3}^{(2,CMatrix1)}$ | $W_{2i_1,2i_1+1}^{(2,CMatrix1)}$ | $W_{2i_1+1,2i_1+2}^{(2,CMatrix1)}$ |

| | $i_2$ | |
|---|---|---|
| | 6 | 7 |
| 0-15 | $W_{2i_1,2i_1+3}^{(2,CMatrix1)}$ | $W_{2i_1+1,2i_1+3}^{(2,CMatrix1)}$ | where $W_{m,m'}^{(2,CMatrix1)} = \begin{bmatrix} v_m & 0 \\ 0 & v_{m'} \end{bmatrix}$, CMatrix2 may be selected from a codebook with all codewords complying with a model of $$\begin{bmatrix} 0 & v_{q'} \\ v_{q'} & 0 \end{bmatrix},$$

for example, CMatrix2 may be a codeword in the following codebook, the terminal performs codeword selection and feedback based on the codebook, and $i_3$ and $i_4$ collectively indicate a codeword with a model of $$W_{q,q'}^{(2,CMatrix2)} = \begin{bmatrix} 0 & v_{q'} \\ v_q & 0 \end{bmatrix},$$

$i_3$ and $i_4$ form an index set I2, and require 3 bit and 2 bit indication signaling for feedback respectively, and $v_q$ and $v_{q'}$ are Mt/2-dimensional vectors here, of which specific models may be determined according to correlation between channels and 2D or 3D MIMO. For example, if related 2D MIMO (linear array antenna arrangement, which supports only vertical or horizontal dimensional beamforming) is considered and compared, $v_q$ and $v_{q'}$ may be DFT vectors, with a mathematical form of:

$$v_q = [1\ e^{j2\pi q/32}\ \ldots\ e^{j(Nt-2)\pi q/32}]^T,\ v_{q'} = [1\ e^{j2\pi q'/32}\ \ldots\ e^{j(Nt-2)\pi q'/32}]^T;$$

if 3D MIMO (matrix antenna arrangement, which support both vertical and horizontal dimensional beamforming) is considered, $v_q$ and $v_{q'}$ may be a Kroneck product form of two DFT vectors, and if non-correlated channels are considered, $v_q$ and $v_{q'}$ may be codewords in an Mt/2-dimensional Gransmannian codebook. The number of codewords may be determined according to requirements for the accuracy of the feedback. However, generally, a sum of feedback overhead of the index set I2 ($i_3$, $i_4$) is less than a sum of feedback overhead of the index set I1 ($i_1$, $i_2$). As shown in table 10,

TABLE 10

| | $i_4$ | |
|---|---|---|
| $i_3$ | 0 | 1 |
| 0-15 | $W_{2i_3,2i_3+1}^{(2,CMatrix2)}$ | $W_{2i_3+1,2i_3+2}^{(2,CMatrix2)}$ |

| | $i_4$ | |
|---|---|---|
| $i_3$ | 2 | 3 |
| 0-15 | $W_{2i_3,2i_3+3}^{(2,CMatrix2)}$ | $W_{2i_3+1,2i_3+3}^{(2,CMatrix2)}$ | where $W_{q,q'}^{(2,CMatrix2)} = \begin{bmatrix} v_q & 0 \\ 0 & v_{q'} \end{bmatrix}$, possibly in a case that a rank is 4 or a number of transmission layers is 4, CMatrix1 may be a codeword in the following codebook, and the terminal performs codeword selection and feedback based on the codebook. As shown in table 11,

TABLE 11

| | $i_2$ | |
|---|---|---|
| $i_1$ | 0 | 1 |
| 0-7 | $W_{8i_1,8i_1+8}^{(4,CMatrix1)}$ | $W_{8i_1+2,8i_1+10}^{(4,CMatrix1)}$ |

| | $i_2$ | |
|---|---|---|
| $i_1$ | 2 | 3 |
| 0-7 | $W_{8i_1+4,8i_1+12}^{(4,CMatrix1)}$ | $W_{8i_1+6,8i_1+14}^{(4,CMatrix1)}$ | where $W_{m,m',n}^{(4,CMatrix1)} = \frac{1}{4}\begin{bmatrix} v_m & v_{m'} & 0 & 0 \\ 0 & 0 & v_m & v_{m'} \end{bmatrix}$ The index set I2 may include $i_1$ and $i_2$, which require 3 bit and 2 bit indication signaling for feedback, and vm and vm' are Mt/2-dimensional vectors here, of which specific models may be determined according to correlation between channels and 2D or 3D MIMO. For example, if related 2D MIMO (linear array antenna arrangement, which supports only vertical or horizontal dimensional beamforming) is considered and compared, $v_m$ and $v_{m'}$ may be DFT vectors, and if 3D MIMO (matrix antenna arrangement, which support both vertical and horizontal dimensional beamforming) is considered, $v_m$ and $v_{m'}$ may be a Kroneck product form of two DFT vectors, and if non-correlated channels are considered, $v_m$ and $v_{m'}$ may be codewords in an Mt/2-dimensional Gransmannian codebook. The number of codewords may be determined according to requirements for the accuracy of the feedback.

CMatrix2 may be a codeword in the following codebook, and the terminal performs codeword selection and feedback based on the codebook. As shown in table 12,

TABLE 12

| | $i_4$ | |
|---|---|---|
| $i_3$ | 0 | 1 |
| 0-3 | $W_{8i_3,8i_3+8,8i_3+14,8i_3+6}^{(4,CMatrix2)}$ | $W_{8i_3+2,8i_3+10,8i_3,8i_3+8}^{(4,CMatrix2)}$ |

| | $i_4$ | |
|---|---|---|
| $i_3$ | 2 | 3 |
| 0-3 | $W_{8i_3+4,8i_3+12,8i_3+2,8i_3+10}^{(4,CMatrix2)}$ | $W_{8i_3+6,8i_3+14,8i_3+4,8i_3+12}^{(4,CMatrix2)}$ | where $W_{m1,m1',m2,m2'}^{(4,CMatrix2)} = \frac{1}{\sqrt{32}} \begin{bmatrix} 0 & 0 & v_{m1'} & v_{m2'} \\ v_{m1} & v_{m2} & 0 & 0 \end{bmatrix}$ The index set I2 may include indexes $i_3$ and $i_4$, which require 2 bit indication signaling for feedback, where $v_{m1}$, $v_{m2}$, $v_{m1'}$, and $v_{m2'}$ are Mt/2-dimensional vectors, of which specific models may be determined according to correlation between channels and 2D or 3D MIMO. For example, if related 2D MIMO (linear array antenna arrangement, which supports only vertical or horizontal dimensional beamforming) is considered and compared, $v_{m1}$, $v_{m2}$, $v_{m1'}$, and $v_{m2'}$ may be DFT vectors, and if 3D MIMO (matrix antenna arrangement, which support both vertical and horizontal dimensional beamforming) is considered, $v_{m1}$, $v_{m2}$, $v_{m1'}$, and $v_{m2'}$ may be a Kroneck product form of two DFT vectors, and if non-correlated channels are considered, $v_{m1}$, $v_{m2}$, $v_{m1'}$, and $v_{m2'}$ may be codewords in an Mt/2-dimensional Gransmannian codebook. The number of codewords may be determined according to requirements for the accuracy of the feedback. However, generally, a sum of feedback overhead of the index set I2 ($i_3$, $i_4$) is less than a sum of feedback overhead of the index set I1 ($i_1$, $i_2$).

In addition to CMatrix1 and CMatrix2, the terminal also needs to calculate the phase information θ, and the proportion information κ, and the phase information θ may be characterized by $e^{j\theta}$. $e^{j\theta}$ may be quantized by a codebook such as a 2 bit codebook {1 j −1 −j} or a 3 bit codebook {1 j −1 −j q0 q1 q2 q3}, herein q0=(1+j)/√2; q1=(−1+j)/√2; and q2=(−1−j)/√2; q3=(1−j)/√2.

κ may also be quantified using a codebook, for example, [−4 dB, −5 dB–6 dB, −8 dB].

After the terminal calculates the above information of CMatrix1, CMatrix2, θ and κ, index information which indicates the information is fed back on an uplink channel. All the codebooks are stored at both the transmitting end and receiving end. Therefore, after the base station receives the indication information, the base station can find the corresponding information of CMatrix1, CMatrix2, θ, and κ according to the same codebook, and then acquire eigenvector information or precoding information CMatrix, i.e. W selected by the terminal, according to a previously agreed function F(CMatrix1,CMatrix2,θ, κ).

Thereby, the base station can use W for precoding.

Exemplary Embodiment Three

For the exemplary embodiment one and exemplary embodiment two described above, a phase θ may be a preset fixed value, for example, a value of θ may be 0, then $e^{j\theta}=1$. Or the phase θ may be a value which is previously configured by a base station to a terminal.

The function F(CMatrix1,CMatrix2,θ,κ) is actually simplified as F(CMatrix1,CMatrix2,κ).

For the exemplary embodiment one and exemplary embodiment two described above, a proportion κ may be a value which is previously configured by the base station to the terminal. The function F(CMatrix1,CMatrix2,θ,κ) is actually simplified as F(CMatrix1,CMatrix2,θ).

For the above cases, the terminal may consider the phase θ and/or the proportion κ as a known variable when selecting other optimal parameters, without performing calculation and feedback.

The function F(CMatrix1,CMatrix2,θ,κ) is actually simplified as:

F(CMatrix1,CMatrix2,κ), F(CMatrix1,CMatrix2,θ) or F(CMatrix1,CMatrix2).

The base station directly uses the same known variables, i.e., the phase θ and/or the proportion κ as those of the terminal when acquiring CMatrix by calculation through the function F.

Exemplary Embodiment Four

For the exemplary embodiment one and exemplary embodiment two described above, $i_1$=findex($i_3$) may be considered to reduce feedback overhead. For example, if an index $i_1$ is selected as Index, findex (i3) is a linear function, for example, findex($i_3$)=$i_3$+q, where q is an integer. Information of two indexes $i_1$ and $i_3$ can actually be known through feedback of $i_1$ or $i_3$.

Exemplary Embodiment Five

A base station transmits a channel measurement pilot. By taking Nt transmission antenna as an example, there are Nt/2 antennas in two mutually perpendicular polarization directions respectively. The base station acquires a set of CSI-RS pilots with a total number of Nt ports. A terminal receives pilot configuration information transmitted by the base station and detects at a corresponding resource location to acquire the information of an Nr×Nt-dimensional channel matrix H. Here, Nr is the number of reception antennas.

The terminal and the base station previously agree on using the following function to characterize eigenvector information or precoding information of the channel matrix.

$$H^H H = \begin{bmatrix} C & D \\ D & C \end{bmatrix} + f(\kappa) \begin{bmatrix} E & F \\ F & -E \end{bmatrix},$$

wherein $$\begin{bmatrix} C & D \\ D & C \end{bmatrix}$$

is DMatrix1, and $$\begin{bmatrix} E & F \\ F & -E \end{bmatrix}$$

is DMatrix2, and the terminal may calculate the following according to the measured channel information:

the terminal and the base station previously agree on using the following model to characterize eigenvector information of DMatrix1:

$$\begin{bmatrix} \sum_{i=1}^{N} A_i e^{j\theta_i^1} u_i & \sum_{i=1}^{N} A_i e^{j\theta_i^2} u_i \\ a\sum_{i=1}^{N} A_i e^{j\theta_i^1} u_i & -a\sum_{i=1}^{N} A_i e^{j\theta_i^2} u_i \end{bmatrix};$$

The terminal and the base station previously agree on using the following model to characterize eigenvector information of DMatrix2:

$$\begin{bmatrix} \sum_{i=1}^{N} A_i e^{j\varphi_i^1} u_i & \sum_{i=1}^{N} A_i e^{j\varphi_i^2} u_i \\ a\sum_{i=1}^{N} A_i e^{j\varphi_i^2} u_i & -a\sum_{i=1}^{N} A_i e^{j\varphi_i^1} u_i \end{bmatrix};$$

herein, a is any of fixed values 1, −1, j, or −j which are previously agreed, or is calculated according to the channel information, N is a fixed value, for example, 2, 3 or 4, or may also be configured by the base station through signaling or determined by the terminal according to the channel information. The above model may be multiplied by a complex scalar in a fixed way to represent that direction information of the eigenvector does not change without affecting the information it contains. The normalization processing may be performed at the base station side.

The terminal selects values of optimal $u_1 \ldots u_N$ and $A_1 \ldots A_N$ and optimal $\theta_1 \ldots \theta_N$ and $\varphi_1 \ldots \varphi_N$ in the above model according to the Nt×Nt-dimensional channel matrix, and feeds them back to the base station.

Here, broadband feedback and long-time feedback may be performed for $u_1 \ldots u_N$ and $A_1 \ldots A_N$, and sub-band feedback and short-time feedback may be performed for $\theta_1 \ldots \theta_N$. The base station builds the eigenvector of DMatrix1 according to the received information of $A_1 \ldots A_N$, $u_1 \ldots u_N$, $\theta_1 \ldots \theta_N$, and $\varphi_1 \ldots \varphi_N$ in accordance with the above agreed model, and may acquire the eigenvalue information of DMatrix1 and DMatrix2 according to the coefficients extracted when the above matrixes are normalized.

The base station may reconstruct DMatrix1 and DMatrix2 based on the eigenvector and eigenvalue, and in turn may acquire information of $H^H H$ in combination with κ through a function Q(DMatrix1, DMatrix2, κ):

$$H^H H = \begin{bmatrix} C & D \\ D & C \end{bmatrix} + f(\kappa)\begin{bmatrix} E & F \\ F & -E \end{bmatrix}.$$

In an alternative implementation, the above function f(κ) may be one of:

$$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, f(\kappa) = \left(\frac{1}{\sqrt{\kappa}+\kappa}\right)^q,$$

herein q is a real number greater than 0, and in the exemplary embodiment, a value of q is alternative equal to 0.5, 1 or 2.

Downlink channel precoding may be calculated based on $H^H H$.

Exemplary Embodiment Six

A base station transmits a channel measurement pilot. By taking Nt transmission antenna as an example, there are Nt/2 antennas in two mutually perpendicular polarization directions respectively. The base station acquires a set of CSI-RS pilots with a total number of Nt ports. A terminal receives pilot configuration information transmitted by the base station and detects at a corresponding resource location to acquire the information of an Nr×Nt-dimensional channel matrix H. Here, Nr is the number of reception antennas.

The terminal and the base station previously agree on using the following function to characterize eigenvector information or precoding information of the channel matrix.

$$H^H H = \begin{bmatrix} C & 0 \\ 0 & D \end{bmatrix} + f(\kappa)\begin{bmatrix} 0 & F \\ E & 0 \end{bmatrix}$$

herein $$\begin{bmatrix} C & 0 \\ 0 & D \end{bmatrix}$$

is DMatrix1, and $$\begin{bmatrix} 0 & F \\ E & 0 \end{bmatrix}$$

is DMatrix2. The terminal may calculate the following according to the measured channel information:

the terminal and the base station previously agree on using the following model to characterize eigenvector information of DMatrix1:

$$\begin{bmatrix} \sum_{i=1}^{N} A_i e^{j\theta_i^1} u_i & 0 \\ 0 & -a\sum_{i=1}^{N} A_i e^{j\theta_i^2} u_i \end{bmatrix};$$

The terminal and the base station previously agree on using the following model to characterize eigenvector information of DMatrix2:

$$\begin{bmatrix} 0 & \sum_{i=1}^{N} A_i e^{j\varphi_i^2} u_i \\ \sum_{i=1}^{N} A_i e^{j\varphi_i^1} u_i & 0 \end{bmatrix};$$

herein, a is any of fixed values 1, −1, j, or −j which are previously agreed, or is calculated according to the channel information, N is a fixed value, for example, 2, 3 or 4, or may also be configured by the base station through signaling or determined by the terminal according to the channel information. The above model may be multiplied by a complex scalar in a fixed way to represent that direction information of the eigenvector does not change without affecting the information it contains. The normalization processing may be performed at the base station side.

The terminal may select values of optimal $u_1 \ldots u_N$ and $A_1 \ldots A_N$ and optimal $\theta_1 \ldots \theta_N$ and $\varphi_1 \ldots \varphi_N$ in the above model according to the Nt×Nt-dimensional channel matrix, and feed them back to the base station. Here, broadband feedback and long-time feedback may be performed for $u_1 \ldots u_N$ and $A_1 \ldots A_N$, and sub-band feedback and short-time feedback may be performed for $\theta_1 \ldots \theta_N$.

The base station builds the eigenvector of DMatrix1 according to the received information of $A_1 \ldots A_N$, $u_1 \ldots u_N$, $\theta_1 \ldots \theta_N$, and $\varphi_1 \ldots \varphi_N$ in accordance with the above agreed model, and may acquire the eigenvalue information of DMatrix1 and DMatrix2 according to the coefficients extracted when normalization processing is performed on the above matrixes.

The base station may reconstruct DMatrix1 and DMatrix2 based on the eigenvector and eigenvalue, and in turn may acquire information of $H^H H$ in combination with $\kappa$ through a function Q(DMatrix1, DMatrix2, $\kappa$):

$$H^H H = \begin{bmatrix} C & D \\ D & C \end{bmatrix} + f(\kappa) \begin{bmatrix} E & F \\ F & -E \end{bmatrix}.$$

In an alternative implementation, the above function $f(\kappa)$ may be one of:

$$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, f(\kappa) = \left(\frac{1}{\sqrt{\kappa}+\kappa}\right)^q,$$

herein q is a real number greater than 0, and in the exemplary embodiment, a value of q is alternatively equal to 0.5, 1 or 2.

Downlink channel precoding may be calculated based on $H^H H$.

Figure 8:
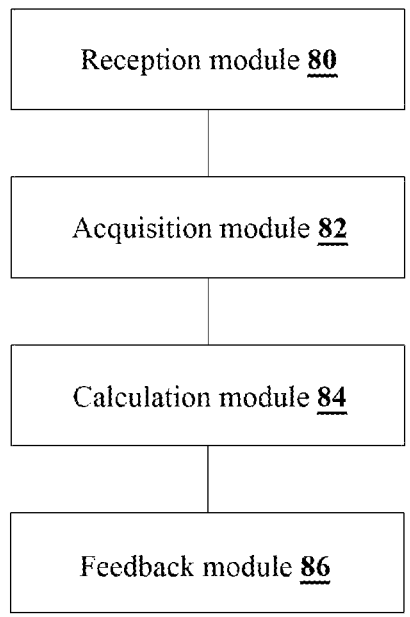
FIG. 8 is a structural block diagram of an apparatus for quantizing and feeding back channel information according to an embodiment of the present disclosure.

FIG. 8 is a structural block diagram of an apparatus for quantizing and feeding back channel information according to an embodiment of the present disclosure. As shown in FIG. 8, the apparatus for quantizing and feeding back channel information may include the following modules. A reception module 80 is arranged to receive a channel measurement pilot signal from a base station. An acquisition module 82 is arranged to acquire the channel information by performing channel measurement according to the channel measurement pilot signal. A calculation module 84 is arranged to calculate a first matrix CMatrix1 and a second matrix CMatrix2 using the channel information, herein CMatrix1 and CMatrix2 are used to quantize the channel information or indicate the base station to perform precoding. And a feedback module 86 is arranged to feed back first indication information of CMatrix1 and/or second indication information of CMatrix2 to the base station.

With the apparatus shown in FIG. 8, the problem in the related technology that the designed feedback model is lack of considering the polarization leakage condition, and thereby as the influences of the polarization leakage are considered in the feedback design, a significant performance gain exists in a case that the polarization leakage actually occurs.

In an exemplary embodiment, the CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as a model, and the CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}.$$

While $V_n$, $V_m$, $V_i$ or $V_j$ may be but is not limited to one of the following cases
 (1) a vector with Mt/2 rows and floor(r/2) columns,
 (2) an orthogonal matrix with Mt/2 rows and floor(r/2) columns, and
 (3) an orthogonal matrix with Mt/2 rows and floor(r/2)+1 columns,
herein Mt is the number of transmission antennas, floor (r/2) represents round down of r/2, r represents information of a number of transmission layers or rank information, and a, $\alpha$ and $\beta$ are complex values.

Figure 9:
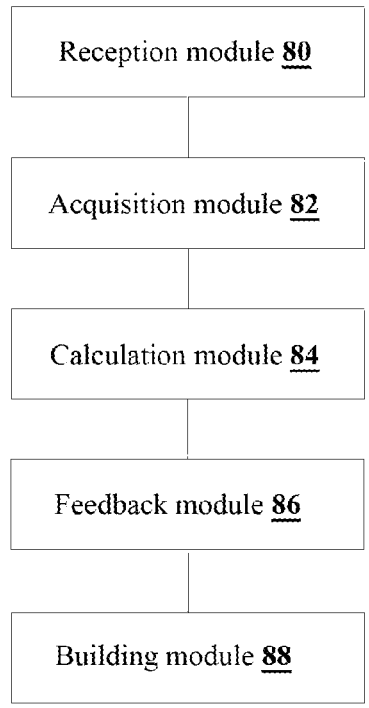
FIG. 9 is a structural block diagram of an apparatus for quantizing and feeding back channel information according to an alternative embodiment of the present disclosure.

In an exemplary embodiment, as shown in FIG. 9, the above apparatus may further include the following modules. A building module 88 is arranged to build a third matrix CMatrix through a function F(CMatrix1,CMatrix2,$\theta$,$\kappa$), herein CMatrix is used to represent the quantized channel characteristic information or indicate the base station to perform precoding, $\theta$ is a phase, and $\kappa$ is a real value.

In an exemplary implementation, $\theta$ is a phase parameter which is determined by the base station and is notified by high layer configuration signaling, or $\theta$ is calculated according to the channel information and third indication information of $\theta$ is fed back to the base station.

In an exemplary implementation, $\kappa$ is a proportional parameter which is determined by the base station and is notified by high layer configuration signaling, or $\kappa$ is calculated according to the channel information and fourth indication information of $\kappa$ is fed back to the base station.

In an exemplary embodiment, CMatrix1 is fed back using a first codebook (CB1), herein a codeword model included in CB1 is $$\begin{bmatrix} V_n & V_m \\ aV_n & -aV_m \end{bmatrix} \text{ or } \begin{bmatrix} V_n & 0 \\ 0 & V_m \end{bmatrix}.$$

In an exemplary implementation, a value of a is 1 and/or j.

In an exemplary embodiment, CMatrix1 is jointly indicated and determined by I1 which is composed of a plurality of PMIs.

In an exemplary embodiment, CMatrix2 is fed back using CB2, wherein a codeword model included in CB2 is $$\begin{bmatrix} V_i & \alpha V_j \\ V_j & -\beta V_i \end{bmatrix} \text{ or } \begin{bmatrix} 0 & V_j \\ V_i & 0 \end{bmatrix}.$$

In an exemplary implementation, values of $\alpha$ and $\beta$ are 1.

In an exemplary embodiment, CMatrix2 is jointly indicated and determined by I2 which is composed of a plurality of PMIs.

In an exemplary implementation, I1 and I2 at least include one identical index.

In an exemplary embodiment, F(CMatrix1, CMatrix2,$\theta$,$\kappa$)=CMatrix1+$e^{j\Theta}$*f($\kappa$)*CMatrix2, wherein f($\kappa$) is a function with an argument of $\kappa$.

in an exemplary implementation, f(κ) may be but is not limited to one of the following cases.

$$f(\kappa) = \left(\frac{1}{\kappa}\right)^q; \qquad (1)$$

$$f(\kappa) = \left(\frac{1}{\sqrt{\kappa}}\right)^q; \qquad (2)$$

$$f(\kappa) = \left(\frac{1+\kappa}{\sqrt{\kappa}}\right)^q; \qquad (3)$$

$$f(\kappa) = \left(\frac{1}{\sqrt{\kappa}+\kappa}\right)^q; \qquad (4)$$

herein q is a real value greater than 0.

In an exemplary implementation, q=0.5, 1 or 2.

Figure 10:
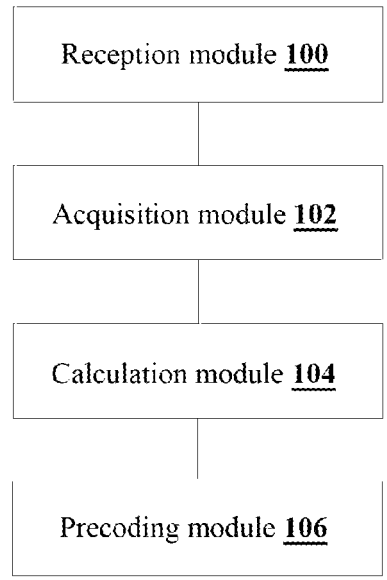
FIG. 10 is a structural block diagram of an apparatus for precoding data according to an embodiment of the present disclosure.

FIG. 10 is a structural block diagram of an apparatus for precoding data according to an embodiment of the present disclosure. As shown in FIG. 10, the apparatus for precoding data may include the following modules. A reception module 100 is to receive an indication information set from a terminal, herein the indication information set includes one of the following information: first indication information of a first matrix CMatrix1 and second indication information of a second matrix CMatrix2, the first indication information, the second indication information and third indication information of a phase θ, and the first indication information, the second indication information, the third indication information and fourth indication information of a proportion κ. An acquisition module 102 is arranged to, when the indication information set includes the first indication information and the second indication information, acquire CMatrix1 through the first indication information and acquire CMatrix2 through the second indication information. Or when the indication information set includes the first indication information, the second indication information and the third indication information of the phase θ, CMatrix1 is acquired through the first indication information, CMatrix2 is acquired through the second indication information, and θ is acquired through the third indication information. Or when the indication information set includes the first indication information, the second indication information, the third indication information and the fourth indication information, CMatrix1 is acquired through the first indication information, CMatrix2 is acquire through the second indication information, θ is acquired through the third indication information, and κ is acquired through the fourth indication information. A calculation module 104 is arranged to, when the indication information set includes the first indication information and the second indication information, calculate a third matrix CMatrix according to a function F(CMatrix1, CMatrix2,θ,κ) which is previously agreed with the terminal using the acquired CMatrix1 and CMatrix2 and θ and κ which are predetermined and issued to the terminal. Or when the indication information set includes the first indication information, the second indication information and the third indication information of the phase θ, calculate CMatrix according to the function F(CMatrix1,CMatrix2,θ,κ) using the acquired CMatrix1 and CMatrix2, θ and κ which is predetermined and issued to the terminal. Or when the indication information set includes the first indication information, the second indication information, the third indication information and the fourth indication information, calculate CMatrix according to the function F(CMatrix1, CMatrix2,θ,κ) using the acquired CMatrix1 and CMatrix2, θ and κ. And a precoding module 106 is arranged to precode the data by using CMatrix.

Figure 11:
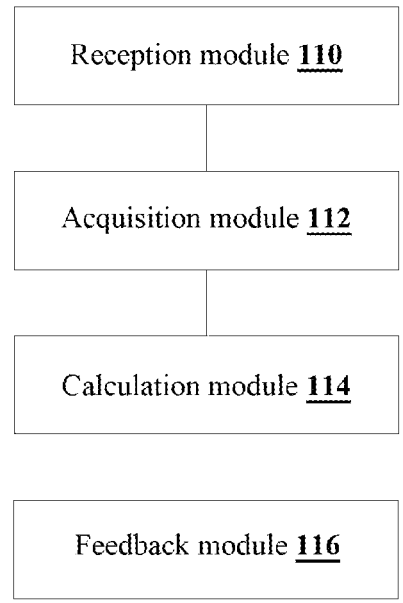
FIG. 11 is a structural block diagram of another apparatus for quantizing and feeding back channel information according to an embodiment of the present disclosure.

FIG. 11 is a structural block diagram of another apparatus for quantizing and feeding back channel information according to an embodiment of the present disclosure. As shown in FIG. 11, the apparatus for quantizing and feeding back channel information may include the following modules. A reception module 110 is arranged to receive a channel measurement pilot signal from a base station. An acquisition module 112 is arranged to acquire the channel information by performing channel measurement according to the channel measurement pilot signal. A calculation module 114 is arranged to calculate a first type of information, a second type of information and a third type of information using the channel information, herein the first type of information includes information indicating N vectors u1, u2, uN, the second type of information includes indication information of P weighting amplitude information $A_1, A_2, \ldots A_P$, and the third type of information comprises indication information of two phase parameter sets, herein the first phase parameter set is $\varphi_1^A, \varphi_2^A, \ldots \varphi_P^A$, and the second phase parameter set is $\varphi_1^B, \varphi_2^B, \ldots \varphi_P^B$; u1, u2, ... uN, $A_1, A_2 \ldots A_P$ and $\varphi_1^A, \varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, ... uN, $A_1, A_2, \ldots A_P, \varphi_1^A, \varphi_2^A, \ldots \varphi_P^A$), u1, u2, ... uN, $A_1, A_2, \ldots A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, ... uN, $A_1, A_2, \ldots A_P, \varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2). And a feedback module 116 is arranged to transmit the first indication information of the first type of information, the second indication information of the second type of information, and the third indication information of the third type of information to the base station.

Figure 12:
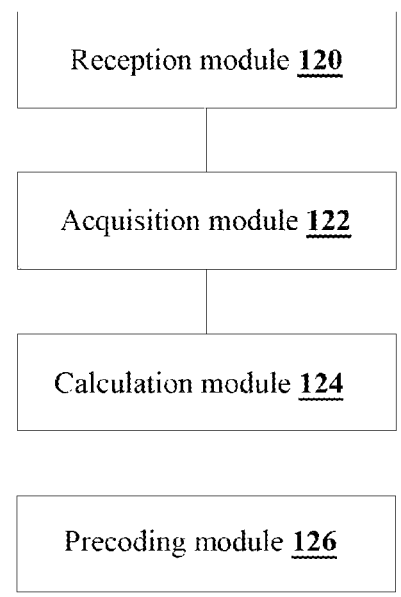
FIG. 12 is a structural block diagram of another apparatus for precoding data according to an embodiment of the present disclosure.

FIG. 12 is a structural block diagram of another apparatus for precoding data according to an embodiment of the present disclosure. As shown in FIG. 12, the apparatus for precoding data may include the following modules. A reception module 120 is arranged to receive first indication information of a first type of information, second indication information of a second type of information, and third indication information of a third type of information from a terminal, herein the first type of information includes information indicating N vectors u1, u2, ..., uN, the second type of information includes indication information of P weighting amplitude information $A_1, A_2, \ldots A_P$, and the third type of information includes indication information of two phase parameter sets, herein the first phase parameter set is $\varphi_1^A$, $\varphi_2^A, \ldots \varphi_P^A$, and the second phase parameter set is $\varphi_1^B$, $\varphi_2^B, \ldots \varphi_P^B$; u1, u2, ... uN, $A_1, A_2, \ldots A_P$ and $\varphi_1^A$, $\varphi_2^A, \ldots \varphi_P^A$ represent a symmetric matrix DMatrix1 in a form of $$\begin{bmatrix} C & D \\ D & C \end{bmatrix} \text{ or } \begin{bmatrix} C & 0 \\ 0 & D \end{bmatrix}$$

through a predefined function F1 (u1, u2, ... uN, $A_1$, $A_2, \ldots A_P$, $\varphi_1^A, \varphi_2^A, \ldots \varphi_P^A$), u1, u2, ... uN, $A_1$, $A_2, \ldots A_P$ and $\varphi_1^B, \varphi_2^B, \ldots \varphi_P^B$ represent a matrix DMatrix2 in a form of $$\begin{bmatrix} E & F \\ F & -E \end{bmatrix} \text{ or } \begin{bmatrix} 0 & E \\ F & 0 \end{bmatrix}$$

through a predefined function F2 (u1, u2, ... uN, $A_1$, $A_2, \ldots A_P$, $\varphi_1^B, \varphi_2^B, \ldots \varphi_P^B$), C, D, E and F are Mt/2×Mt/2 Hermitian matrixes, Mt is the number of transmission antennas, Dmatrix1 and Dmatrix2 represent auto-correlation matrix information R of a channel or characteristic information/precoding information W of the channel through a previously agreed function Q(DMatrix1, DMatrix2). An acquisition module 122 is arranged to acquire the first type of information according to the first indication information, acquire the second type of information according to the second indication information, and acquire the third type of information according to the third indication information. A calculation module 124 is arranged to calculate DMatrix1 and DMatrix2 using the first type of information, the second type of information and the third type of information, and calculate R or W through Q(DMatrix1, DMatrix2). And a precoding module 126 is arranged to precode the data according to R or W.

It can be seen from the above description that the above embodiments achieve the following technical effects (it should be illustrated that these effects are effects which can be achieved by some exemplary embodiments): with the technical solution provided by the embodiments of the present disclosure, as the influences $H_z^H H_z$ and $(H_z^H H_x + H_x^H H_z)$ due to the polarization leakage are considered in the feedback design, compared with the assumption in the existing technology that only $H^H H \approx H_x^H H_x$ is considered, a significant performance gain exists in a case that the polarization leakage actually occurs.

Obviously, those skilled in the art should understand that each module or each step of the aforementioned present disclosure can be implemented with general computing devices, and can be integrated in a single computing device, or distributed onto a network consisting of a plurality of computing devices. Alternatively, they can be implemented with program codes executable by the computing devices, and therefore, they can be stored in storage devices to be executed by the computing devices. And in some cases the illustrated or described steps may be performed in a different order from the order here. Alternatively, they are respectively made into a plurality of integrated circuit modules. And alternatively, it is implemented with making several modules or steps of them into a single integrated circuit module. Thus, the present disclosure is not limited to any specific combinations of hardware and software.

The above description is only the specific embodiments of the present disclosure and is not used to limit the present disclosure, and the present disclosure can also have a variety of changes and variations for those skilled in the art. Any modification, equivalent substitution, improvement, etc. made within the spirit and principle of the present disclosure, should be included in the protection scope of the present disclosure.

INDUSTRIAL APPLICABILITY

As described above, the methods and apparatuses for quantizing, and feeding back channel information and precoding data according to the embodiments of the present disclosure have the following beneficial effects: a significant performance gain exists in the feedback design provided by the embodiments of the present disclosure in a case that the polarization leakage actually occurs.

What is claimed is:
1. A method for quantizing and feeding back channel information, comprising:
 receiving a channel measurement pilot signal from a base station;
 acquiring channel information by performing channel measurement according to the channel measurement pilot signal;
 calculating a first matrix CMatrix1 and a second matrix CMatrix2 using the channel information, wherein the CMatrix1 and CMatrix2 are used to quantize the channel information or indicate the base station to perform precoding; and
 feeding back first indication information of the CMatrix1 and/or second indication information of the CMatrix2 to the base station;
 wherein after calculating the CMatrix1 and the CMatrix2 using the channel information, the method further comprises:
 building a third matrix CMatrix through a function F(CMatrix1,CMatrix2,θ,κ), wherein the CMatrix is used to represent the quantized channel characteristic information or indicate the base station to perform precoding, the θ is a phase, and the κ is a real value;
wherein
the CMatrix1 is a matrix with

$$\begin{bmatrix} V_n & V_m \\ aV_n & -aV_m \end{bmatrix} \text{ or } \begin{bmatrix} V_n & 0 \\ 0 & V_m \end{bmatrix}$$

as a model,
and the CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}$$

as a model; and $V_n, V_m, V_i$ or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, wherein Mt is the number of transmission antennas, floor(r/2) represents round down of r/2, r represents information of the number of transmission layers or rank information, and a, α and β are complex values;
wherein the θ is a phase parameter which is determined by the base station and is notified by high layer configuration signaling, or the θ is calculated according to the channel information and third indication information of θ is fed back to the base station;

or wherein the κ is a proportional parameter which is determined by the base station and is notified by high layer configuration signaling, or the κ is calculated according to the channel information and fourth indication information of the κ is fed back to the base station.

2. The method according to claim 1, wherein the CMatrix1 is fed back by using a first codebook CB1, wherein a codeword model included in the CB1 is $$\begin{bmatrix} V_n & V_m \\ aV_n & -aV_m \end{bmatrix} \text{ or } \begin{bmatrix} V_n & 0 \\ 0 & V_m \end{bmatrix},$$

wherein a value of the a is 1 and/or j.

3. The method according to claim 1, wherein CMatrix1 is jointly indicated and determined by a first set I1 which is composed of a plurality of Precoding Matrix Indexes, PMIs.

4. The method according to claim 1, wherein CMatrix2 is fed back using a second codebook CB2, wherein a codeword model included in CB2 is $$\begin{bmatrix} V_i & \alpha V_j \\ V_j & -\beta V_i \end{bmatrix} \text{ or } \begin{bmatrix} 0 & V_j \\ V_i & 0 \end{bmatrix},$$

wherein values of the α and β are 1.

5. The method according to claim 1, wherein the CMatrix2 is jointly indicated and determined by a second set I2 which is composed of a plurality of Precoding Matrix Indexes, PMIs, wherein I1 and I2 at least comprise one identical index.

6. The method according to claim 1, wherein F(CMatrix1,CMatrix2,θ,κ)=CMatrix1+$e^{j\theta}$*f(κ)*CMatrix2, wherein f(κ) is a function with an argument of κ, wherein f(κ) is one of $$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, \text{ and}$$

$$f(\kappa) = \left(\frac{1}{\sqrt{\kappa}+\kappa}\right)^q,$$

wherein q is a real value greater than 0, and q=0.5, 1 or 2.

7. A method for precoding data, comprising:

receiving an indication information set from a terminal, wherein the indication information set comprises: first indication information of a first matrix CMatrix1, second indication information of a second matrix CMatrix2 and third indication information of a phase θ;

acquiring CMatrix1 through the first indication information, acquiring the CMatrix2 through the second indication information, and acquiring the θ through the third indication information;

calculating a third matrix CMatrix according to the function F(CMatrix1,CMatrix2,θ,κ) using the acquired CMatrix1 and CMatrix2, the θ and the κ which is predetermined and sent to the terminal; wherein the θ is calculated by the terminal according to its obtained channel information;

or, receiving an indication information set from a terminal, wherein the indication information set comprises: first indication information of a first matrix CMatrix1, second indication information of a second matrix CMatrix2, third indication information of a phase θ and fourth indication information of a proportion κ;

acquiring the CMatrix1 through the first indication information, acquiring the CMatrix2 through the second indication information, acquiring the θ through the third indication information, and acquiring the κ through the fourth indication information;

calculating the CMatrix according to the function F(CMatrix1,CMatrix2,θ,κ) using the acquired CMatrix1 and CMatrix2,θ and κ; wherein the θ is calculated by the terminal according to its obtained channel information, or the κ is calculated by the terminal according to its obtained channel information;

and precoding the data using the CMatrix;

wherein the θ is a phase, and the κ is a real value;

wherein the CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as a model, and the CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}$$

as a model; and $V_n$, $V_m$, $V_I$ or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, wherein Mt is the number of transmission antennas, floor(r/2) represents round down of r/2, r represents information of the number of transmission layers or rank information, and a, α and β are complex values.

8. An apparatus for quantizing and feeding back channel information, comprising a reception circuit, arranged to receive a channel measurement pilot signal from a base station;

and hardware performing instructions stored in a non-transitory computer readable medium which executes steps in following modules:

an acquisition module arranged to acquire channel information by performing channel measurement according to the channel measurement pilot signal;

a calculation module arranged to calculate a first matrix CMatrix1 and a second matrix CMatrix2 using the channel information, wherein the CMatrix1 and the CMatrix2 are used to quantize the channel information or indicate the base station to perform precoding; and a feedback module arranged to feed back first indication information of the CMatrix1 and/or second indication information of the CMatrix2 to the base station;

a building module arranged to build a third matrix CMatrix through a function F(CMatrix1,CMatrix2,θ,κ), wherein the CMatrix is used to represent the quantized channel characteristic information or indicate the base station to perform precoding, the θ is a phase, and the κ is a real value;
wherein
the CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix},$$

as a model, and the CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix},$$

as a model; and $V_n$, $V_m$, $V_i$, or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, wherein Mt is the number of transmission antennas, floor(r/2) represents round down of r/2, r represents information of the number of transmission layers or rank information, and the a, α and β are complex values;
wherein the θ is a phase parameter which is determined by the base station and is notified by high layer configuration signaling, or the θ is calculated according to the channel information and third indication information of θ is fed back to the base station;
or
wherein the κ is a proportional parameter which is determined by the base station and is notified by high layer configuration signaling, or the θ is calculated according to the channel information and fourth indication information of θ is fed back to the base station.

9. The apparatus according to claim 8, wherein CMatrix1 is fed back by using a first codebook CB1, wherein a codeword model included in the CB1 is $$\begin{bmatrix} V_n & V_m \\ aV_n & -aV_m \end{bmatrix} \text{ or } \begin{bmatrix} V_n & 0 \\ 0 & V_m \end{bmatrix},$$

wherein the value of the a is 1 and/or j.

10. The apparatus according to claim 8, wherein the CMatrix1 is jointly indicated and determined by a first set I1 which is composed of a plurality of Precoding Matrix Indexes, PMIs.

11. The apparatus according to claim 8, wherein the CMatrix2 is fed back by using a second codebook CB2, wherein a codeword model included in CB2 is $$\begin{bmatrix} V_i & \alpha V_j \\ V_j & -\beta V_i \end{bmatrix} \text{ or } \begin{bmatrix} 0 & V_j \\ V_i & 0 \end{bmatrix},$$

wherein values of the α and said the β are 1.

12. The apparatus according to claim 8, wherein CMatrix2 is jointly indicated and determined by a second set I2 which is composed of a plurality of Precoding Matrix Indexes, PMIs, wherein I1 and I2 at least comprise one identical index.

13. The apparatus according to claim 8, wherein F(CMatrix1,CMatrix2,θ,κ)=CMatrix1+$e^{jθ}$*f(κ)*CMatrix2, wherein the f(κ) is a function with an argument of κ, wherein the f(κ) is one of $$f(\kappa) = \left(\frac{1}{\kappa}\right)^q, f(\kappa) = \left(\frac{1}{\sqrt{\kappa}}\right)^q, f(\kappa) = \left(\frac{1+\kappa}{\sqrt{\kappa}}\right)^q, \text{ and}$$

$$f(\kappa) = \left(\frac{1}{\sqrt{\kappa}+\kappa}\right)^q,$$

wherein q is a real value greater than 0, and q=0.5, 1 or 2.

14. An apparatus for precoding data, comprising hardware performing instructions stored in a non-transitory computer readable medium which executes steps in following modules:
a reception module arranged to receive an indication information set from a terminal, wherein the indication information set comprises: first indication information of a first matrix CMatrix1 and second indication information of a second matrix CMatrix2 and third indication information of a phase θ; or the indication information set comprises: first indication information of a first matrix CMatrix1 and second indication information of a second matrix CMatrix2 and third indication information of a phase θ, and fourth indication information of a proportion κ;
an acquisition module arranged to when the indication information set comprises the first indication information, the second indication information and the third indication information of the phase θ, acquire CMatrix1 through the first indication information, acquire CMatrix2 through the second indication information, and acquire θ through the third indication information; or when the indication information set comprises the first indication information, the second indication information, the third indication information and the fourth indication information, acquire the CMatrix1 through the first indication information, acquire the CMatrix2 through the second indication information, acquire the θ through the third indication information, and acquire κ through the fourth indication information;
a calculation module arranged to, when the indication information set comprises the first indication information, the second indication information and the third indication information of the phase θ, calculate a third matrix CMatrix according to the function F(CMatrix1, CMatrix2,θ,κ) using acquired CMatrix1 and CMatrix2, θ and κ which is predetermined and sent to the terminal; wherein the θ is calculated by the terminal according to its obtained channel information; or when the indication information set comprises the first indication information, the second indication information, the third indication information and the fourth indication information, calculate the CMatrix according to the function F(CMatrix1,CMatrix2,θ,κ) using the acquired CMatrix1 and CMatrix2, θ and κ; wherein the θ is calculated by the terminal according to its obtained channel information, or the κ is calculated by the terminal according to its obtained channel information; and
a precoding module arranged to precode the data using CMatrix;
wherein the θ is a phase, and the κ is a real value;

wherein
the CMatrix1 is a matrix with $$\begin{bmatrix} V_n & V_m \\ aV_n & -aV_m \end{bmatrix} \text{ or } \begin{bmatrix} V_n & 0 \\ 0 & V_m \end{bmatrix}$$

as a model,
and the CMatrix2 is a matrix with $$\begin{bmatrix} V_i & \alpha V_j \\ V_j & -\beta V_i \end{bmatrix} \text{ or } \begin{bmatrix} 0 & V_j \\ V_i & 0 \end{bmatrix}$$

as a model; and $V_n$, $V_m$, $V_I$ or $V_j$ is one of a vector with Mt/2 rows and floor(r/2) columns, an orthogonal matrix with Mt/2 rows and floor(r/2) columns, and an orthogonal matrix with Mt/2 rows and floor(r/2)+1 columns, wherein Mt is the number of transmission antennas, floor(r/2) represents round down of r/2, r represents information of the number of transmission layers or rank information, and a, $\alpha$ and $\beta$ are complex values.

\* \* \* \* \*